(12) United States Patent
Kennedy et al.

(10) Patent No.: US 7,202,317 B2
(45) Date of Patent: Apr. 10, 2007

(54) POLYMERIZATION OF I-BUTENE IN HYDROCARBON MEDIA USING BIS(BORANE) CO-INITIATORS

(75) Inventors: Joseph P. Kennedy, Akron, OH (US); Scott Collins, North Canton, OH (US); Stewart P. Lewis, Zanesville, OH (US)

(73) Assignee: The University of Akron, Akron, OH (US)

( * ) Notice: Subject to any disclaimer, the term of this patent is extended or adjusted under 35 U.S.C. 154(b) by 187 days.

(21) Appl. No.: 10/817,465

(22) Filed: Apr. 2, 2004

(65) Prior Publication Data

US 2005/0027086 A1 Feb. 3, 2005

Related U.S. Application Data

(60) Provisional application No. 60/518,236, filed on Nov. 7, 2003, provisional application No. 60/463,601, filed on Apr. 17, 2003.

(51) Int. Cl.
*C08F 2/16* (2006.01)
*C08F 4/50* (2006.01)
*C08F 4/52* (2006.01)
*C07F 5/02* (2006.01)

(52) U.S. Cl. .................. 526/196; 526/185; 526/190; 526/194; 526/198; 526/339; 526/348.7; 568/3; 556/121

(58) Field of Classification Search ................ 526/185, 526/190, 194, 196, 198, 92, 339, 348.7; 568/3; 556/121
See application file for complete search history.

(56) References Cited

U.S. PATENT DOCUMENTS

| | | | |
|---|---|---|---|
| 5,198,401 A | 3/1993 | Turner et al. | 502/155 |
| 5,376,744 A | 12/1994 | Kennedy et al. | 526/89 |
| 5,448,001 A | 9/1995 | Baird | 526/134 |
| 5,506,316 A * | 4/1996 | Shaffer | 526/185 |
| 5,703,182 A | 12/1997 | Langstein et al. | 526/185 |
| 6,008,307 A | 12/1999 | Shaffer | 526/190 |
| 6,255,531 B1 * | 7/2001 | Fritz et al. | 568/3 |
| 6,291,695 B1 | 9/2001 | Marks et al. | 556/53 |

FOREIGN PATENT DOCUMENTS

| | | |
|---|---|---|
| DE | 198 36 663 A1 | 2/2000 |
| WO | WO 95/29940 | 11/1995 |
| WO | WO 99/06413 | 2/1999 |
| WO | WO 00/04061 | 1/2000 |

OTHER PUBLICATIONS

Williams et al, "New Bifunctional Perfluoroary Boranes . . . ," J. Am. Chem. Soc., 1999, 121, 3244-3245.*
"Isobutene Polymerization Using Initiating Systems Based on $C_6F_4$-1,2-[B($C_6F_5$)2]2 (1-$F_4$)", The University of Akron, Dept. of Polymer Science, Apr. 17, 2003, Goodyear Auditorium, Stewart P. Lewis, pp. 1-46.

"Carbocationic Initiation of Polymerization of Vinyl Ethers and N-Vinylcarbazole Induced by ($\eta^5$-$C_5Me_5$)TiMe$_2$($\mu$-Me)B($C_6F_5$)$_3$. The First Examples of Polymerization of This Class of Electron-Rich Olefins by a Metallocene-like Initiator", Q. Wang and M. C. Baird, Macromolecules, vol. 28, No. 24, 1995, pp. 8021-8027.
"Carbocationic Alkene Polymerizations Initiated by Organotransition Metal Complexes: An Alternative, Unusual Roal for Soluble Ziegler-Natta Catalysts", M. C. Baird, Chem. Rev. 2000, 100, pp. 1471-1478.
"Isobutene Polymerization Initiated by [CP-X-TiMe$_2$]– in the Presence of a Series of Novel, Weakly Coordinating Counteranions", K. R. Kumar, C.Hall, A. Penciu, M. J. Drewitt, P. J. McInenly, and M. C. Baird, Journal of Polymer Science: Part A: Polymer Chemistry, vol. 40, 2002, pp. 3302-3311.
"Higly Lewis Acidic Bifunctional Organoboranes", W. E. Piers, G. J. Irvine, and V. C. Williams, Microreview, Eur. J. Inorg. Chem. 2000, EurJIC 047/00, pp. 1-12.
"The [Zr(N{SiMe$_3$}$_2$)$_3$]+ Cation as a Novel Initiator for Carbocationic Isobutene Homo- and Isobutene/Isoprene Co-Polymerizations", A. G. Carr, D. M. Dawson, and M. Bochmann, Macromol. Rapid Commun. 19, 1998, pp. 205-207.
The Aluminocenium Cation [Al($C_5H_5$)$_2$]+: A Highly Effective Initiator for the Cationic Polymerization of Isobutene, M. Bochmann and D. M. Dawson, Communications, Angew. Chem. Int. Ed. Engl. 1996, 35, No. 19, pp. 2226-2228.
"Isobutene Polymerization using a Chelating Diborane Co-Initiator", S. P. Lewis, N. J. Taylor, W. E. Piers, and S. Collins, J. Am. Chem. Soc. 2003, 125, pp. 14686-14687.
"Noncoordinating Anions in Carbocationic Polymerizations", T. D. Shaffer and J. R. Ashbaugh, Journal of Polymer Science: Part A: Polymer Chemistry, vol. 35, 1997, pp. 329-344.
"Zirconocenes as Initiators for Carbocationic Isobutene Homo- and Copolymerizations", A. G. Carr, D. M. Dawson, and M. Bochmann, Macromolecules, vol. 31, No. 7, 1998, pp. 2035-2040.
"Cationic Polymerizations at Elevated Temperatures by Novel Initiating Systems Having Weakly Coordinating Counteranions. 1. High Molecular Weight Polyisobutylenes", Z. Pi, S. Jacob, and J. P. Kennedy, Ionic Polymerizations and Related Processes edited by Judith E. Puskas, part of the NATO Science Series, Series E, Applied Sciences, vol. 359, 1999, pp. 1-12.
"Highest Molecular Weight Polyisobutylenes and Isobutylene Copolymers by Initiating Systems Having Weakly-Coordinating Counteranions", J. P. Kennedy, Z. Pi, and S. Jacob, Polymeric Materials: Science and Engineering Proceedings of the A.C.S. Division of Polymeric Materials, vol. 80, 1999, p. 495.
"Carbocationic Polymerizations with Noncoordinating Boron Gegenions", T. D.Shaffer and J. R. Ashbaugh, Book of Abstracts, 211th ACS National Meeting, New Orleans, LA, Mar. 24-28 (1996), Publisher: American Chemical Society, Washington D.C., pp. 339-340.

* cited by examiner

*Primary Examiner*—Fred Teskin
(74) *Attorney, Agent, or Firm*—Roetzel & Andress, LPA; George W. Moxon, II

(57) ABSTRACT

A method is provided for cationically polymerizing olefin monomer by using a novel coinitiator in the presence of water. More specifically, a method is provided for cationically polymerizing olefin monomer by using a novel coinitiator in an aqueous suspension or aqueous emulsion polymerization process.

90 Claims, 15 Drawing Sheets

I $Ar^F = C_6F_5$ or $Ar^F{}_2 = C_{12}F_8$ $Ar^F = C_6F_5$ or $Ar^F_2 = C_{12}F_8$ $Ar^F = C_6F_5$ or $Ar^F{}_2 = C_{12}F_8$ $Ar^F = C_6F_5$ or $Ar^F{}_2 = C_{12}F_8$

X = CH$_2$, NR, or O

Ar$^F$ = C$_6$F$_5$ or Ar$^F_2$ = C$_{12}$F$_8$

X = CH$_2$, NR, or O

Ar$^F$ = C$_6$F$_5$ or Ar$^F_2$ = C$_{12}$F$_8$ $Ar^F = C_6F_5$ or $Ar^F_2 = C_{12}F_8$ $Ar^F = C_6F_5$ or $Ar^F_2 = C_{12}F_8$ $Ar^F = C_6F_5$ or $Ar^F_2 = C_{12}F_8$

POLYMERIZATION OF I-BUTENE IN HYDROCARBON MEDIA USING BIS(BORANE) CO-INITIATORS

This application claims priority from provisional patent application Ser. Nos. 60/463,601 and 60/518,236.

TECHNICAL FIELD

This invention relates to a cationic-polymerization method that uses new coinitiators. This invention also relates to a method for synthesizing 1,2-$C_6F_4[B(Br)_2]_2$:

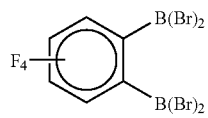

BACKGROUND OF THE INVENTION

Poly(isobutene) (PIB) is an important industrial commodity that is prepared by the polymerization of isobutene (IB), a cheap petrochemical obtained by the cracking of higher hydrocarbons. Depending on its molecular weight (MW), PIB is used in hundreds if not thousands of diverse applications, e.g., rubbers, lubricants, adhesives, viscosity control agents, additives. The polymerization of IB is carried out by large companies world-wide, including Exxon-Mobil, BASF, Oronite, BP, Japan Synthetic Rubber, etc.

IB polymerization is effected either in the bulk (BASF) or in the liquid phase by the use of hydrocarbon or chlorinated hydrocarbon diluents at cryogenic temperatures. The typical polymerization initiation systems include strong Lewis acids ($BF_3$, $AlCl_3$, $TiCl_4$, etc); these acids are highly moisture sensitive and rapidly hydrolyze to noxious side products during work-up. Environmental concerns (air, water pollution) present important issues even with state-of-the-art industrial processes.

Cationically polymerized olefins, such as butyl rubber, a co-polymer of i-butene (IB) and isoprene (IP), have long been commercially important synthetic rubbers. For example, about 500 million pounds of butyl rubber (BR) were produced in the United States in 1991. Conventional methods of BR manufacture employ low temperature (as low as −100° C.) and the presence of a Lewis acid, such as $AlCl_3$, in a chlorinated hydrocarbon solvent. Under these conditions, production of high MW (>200,000) BR, occurs at acceptable rates. Chlorinated hydrocarbon solvents are used because they have sufficient polarity to stabilize the transition states, and thus lower the activation energy for ion generation in carbocationic polymerization. The low temperatures are used to slow the termination and chain transfer processes that limit the growth in the molecular weight of the polymer chains. Less polar solvents are generally less effective at stabilizing transition states, and thus fewer carbocations are produced that are active in polymerization. The solvent also needs to act as a fluid heat transfer medium to dissipate the heat of polymerization. The solvent should optimally dissolve the ingredients of the polymerization. Methyl chloride is useful in the synthesis of BR, as it is both a polar solvent (which enhances propagation rates) and a poor solvent for BR so that the process is a suspension polymerization at these low temperatures.

Recent legislation in the United States allows the continued use of methyl chloride in existing facilities, but expanded facilities and/or new plants will be required to use alternative solvents that are not chlorinated. Hence there is a need to develop initiators which will be effective in the absence of a halogenated solvent in producing high MW BR at commercially acceptable rates.

A variety of Lewis acidic, main group and transition metal initators or co-initiators of i-butene (IB) polymerization have been reported to provide poly(i-butene) (PIB) or co-polymers of IB and IP in the absence of chlorinated solvents or with a minimum amount of chlorinated solvents being present. However, none of these compositions is believed to provide BR of sufficiently high MW at acceptable rates in the absence of chlorinated solvents. Therefore, there is a continuing need to develop alternative initiator compositions.

SUMMARY OF INVENTION

This invention is generally directed to a method for cationically polymerizing olefin monomer comprising the step of using a composition having the chemical structure:

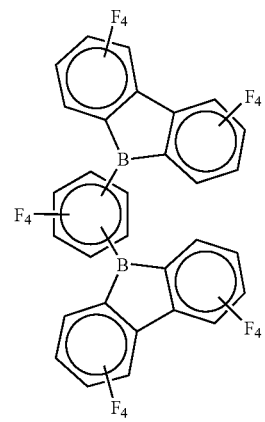

as a coinitiator in the presence of water.

This invention is generally directed to a method for cationically polymerizing olefin monomer comprising the step of using a composition having the chemical structure:

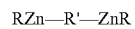

as a coinitiator in the presence of water;

wherein each R is independently selected from the group consisting of a perfluorophenyl; 3,5-bis(trifluoromethyl)phenyl; 1-perfluoronaphthyl; 2-perfluoronaphthyl; 2-perfluorobiphenyl; 3-perfluorobiphenyl; 4-perfluorobiphenyl; and p-R"$_3$Si-2,3,5,6-tetrafluorophenyl;

wherein R' is 1,2-perfluorophenylenyl; 1,2-perfluoronaphthalenyl; 2,3-perfluoronapthalenyl; 1,8-perfluoronaphthalenyl; 1,2-perfluoroanthracenyl; 2,3-perfluoroanthracenyl; 1,9-perfluoroanthracenyl; 1,2-perfluorophenanthrenyl; 2,3-perfluorophenanthrenyl; 1,10-perfluorophenanthrenyl; 9,10-perfluorophenanthrenyl; 2,2'-perfluorobiphenylenyl; 2,2'-perfluoro-1,1'-binaphthalenyl; 3,3'-perfluoro-2,2'-binaphthalenyl; or 1,1'-ferrocenyl; and wherein R" is a $C_1$, $C_2$, $C_3$, $C_4$, $C_5$, $C_6$, $C_7$, $C_8$, $C_9$, or $C_{10}$ alkyl.

This invention is generally directed to a method for cationically polymerizing olefin monomer comprising the step of using a composition having the chemical structure:

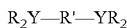

as a coinitiator in an organic phase or neat monomer reaction phase;

wherein Y is boron or aluminum;

wherein each R is independently selected from the group consisting of a perfluorophenyl; 3,5-bis(trifluoromethyl) phenyl; 1-perfluoronaphthyl; 2-perfluoronaphthyl; 2-perfluorobiphenyl; 3-perfluorobiphenyl; 4-perfluorobiphenyl; and p-R''$_3$Si-2,3,5,6-tetrafluorophenyl;

wherein R' is 1,2-perfluorophenylenyl; 1,2-perfluoronaphthalenyl; 2,3-perfluoronapthalenyl; 1,8-perfluoronaphthalenyl; 1,2-perfluoroanthracenyl; 2,3-perfluoroanthracenyl; 1,9-perfluoroanthracenyl; 1,2-perfluorophenanthrenyl; 2,3-perfluorophenanthrenyl; 1,10-perfluorophenanthrenyl; 9,10-perfluorophenanthrenyl; 2,2'-perfluorobiphenylenyl; 2,2'-perfluoro-1,1'-binaphthalenyl; 3,3'-perfluoro-2,2'-binaphthalenyl; or 1,1'-ferrocenyl; and wherein R'' is a $C_1$, $C_2$, $C_3$, $C_4$, $C_5$, $C_6$, $C_7$, $C_8$, $C_9$, or $C_{10}$ alkyl.

This invention is generally directed to a method for cationically polymerizing olefin monomers comprising the step of using a composition having the chemical structure:

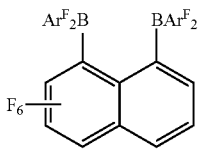

wherein $Ar^F=C_6F_5$ or $Ar^F_2=C_{12}F_8$
as a coinitiator in the presence of water.

This invention is generally directed to a method for cationically polymerizing olefin monomers comprising the step of using a composition having the chemical structure:

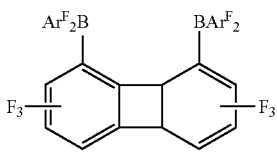

wherein $Ar^F=C_8F_5$ or $Ar^F_2=C_{12}F_8$
as a coinitiator in the presence of water.

This invention is generally directed to a method for cationically polymerizing olefin monomers comprising the step of using a composition having the chemical structure:

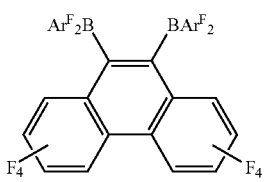

wherein $Ar^F=C_6F_5$ or $Ar^F_2=C_{12}F_8$

This invention is generally directed to a method for cationically polymerizing olefin monomers comprising the step of using a composition having the chemical structure:

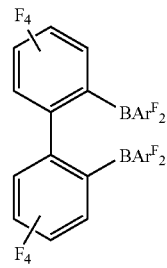

wherein $Ar^F=C_6F_5$ or $Ar^F_2=C_{12}F_8$
as a coinitiator in the presence of water.

This invention is generally directed to a method for cationically polymerizing olefin monomers comprising the step of using a composition having the chemical structure:

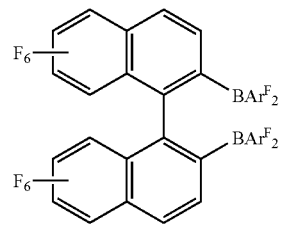

wherein $Ar^F=C_6F_5$ or $Ar^F_2=C_{12}F_8$
as a coinitiator in the presence of water.

This invention is generally directed to a method for cationically polymerizing olefin monomers comprising the step of using a composition having the chemical structure:

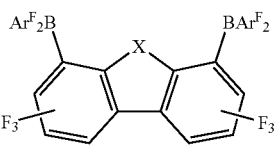

wherein $X=CH_2$, NR, or O
and $Ar^F=C_6F_5$ or $Ar^F_2=C_{12}F_8$
as a coinitiator in the presence of water.

This invention is generally directed to a method for cationically polymerizing olefin monomers comprising the step of using a composition having the chemical structure:

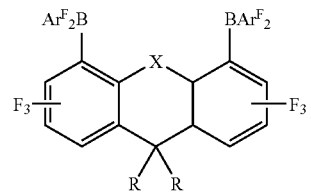

wherein $X=CH_2$, NR, or O
and $Ar^F=C_6F_5$ or $Ar^F_2=C_{12}F_8$
as a coinitiator in the presence of water.

This invention is generally directed to a method for cationically polymerizing olefin monomers comprising the step of using a composition having the chemical structure:

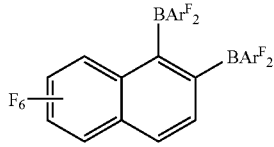

wherein $Ar^F = C_6F_5$ or $Ar^F_2 = C_{12}F_8$ as a coinitiator in the presence of water.

This invention is generally directed to a method for cationically polymerizing olefin monomers comprising the step of using a composition having the chemical structure:

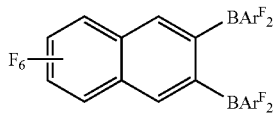

wherein $Ar^F = C_6F_5$ or $Ar^F_2 = C_{12}F_8$ as a coinitiator in the presence of water.

This invention is generally directed to a method for cationically polymerizing olefin monomers comprising the step of using a composition having the chemical structure:

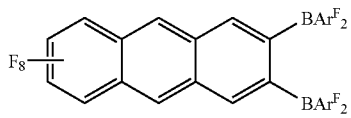

wherein $Ar^F = C_6F_5$ or $Ar^F_2 = C_{12}F_8$ as a coinitiator in the presence of water.

This invention is generally directed to a method for cationically polymerizing olefin monomers comprising the step of using a composition having the chemical structure:

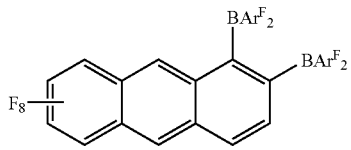

wherein $Ar^F = C_6F_5$ or $Ar^F_2 = C_{12}F_8$ as a coinitiator in the presence of water.

This invention is generally directed to a method for cationically polymerizing olefin monomers comprising the step of using a composition having the chemical structure:

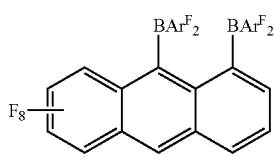

wherein $Ar^F = C_6F_5$ or $Ar^F_2 = C_{12}F_8$ as a coinitiator in the presence of water.

This invention is generally directed to a method for cationically polymerizing olefin monomers comprising the step of using a composition having the chemical structure:

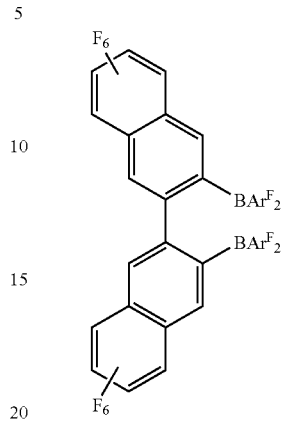

wherein $Ar^F = C_6F_5$ or $Ar^F_2 = C_{12}F_8$ as a coinitiator in the presence of water.

This invention generally provides a cationic-polymerization method that uses new coinitiators. The invention also provides for a cationic-polymerization method that uses new coinitiators in the presence of water. This invention also provides a method for making $1,2\text{-}C_6F_4[B(Br)_2]_2$:

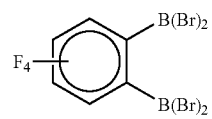

at an improved yield compared to prior-art methods.

Figure 9:
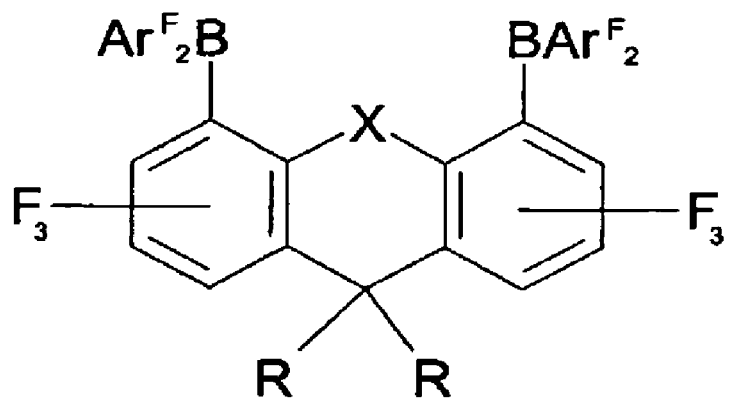
Figure 10:
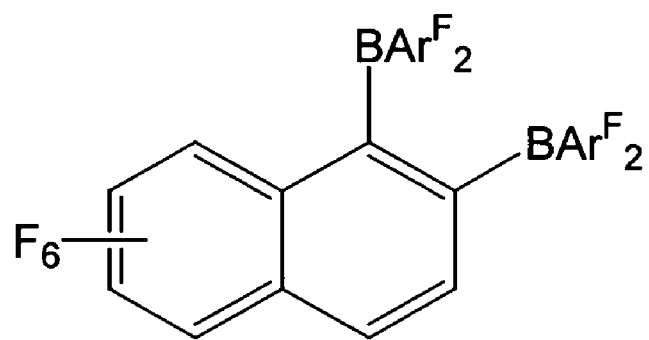
Figure 11:
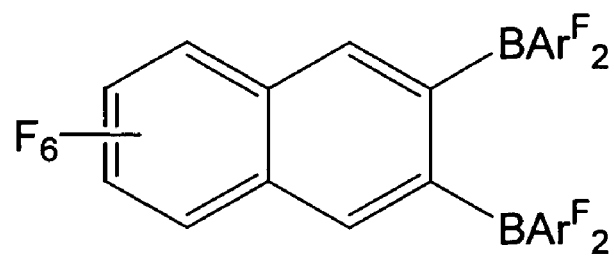
Figure 11:
Figure 12:
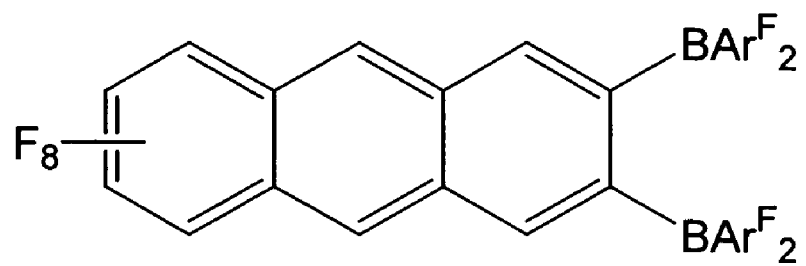
Figure 12:
Figure 13:
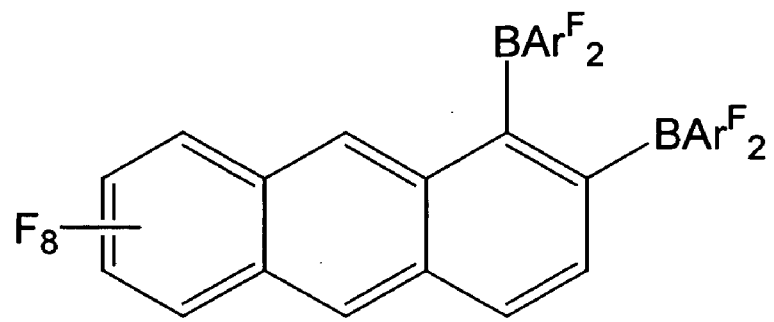
Figure 14:
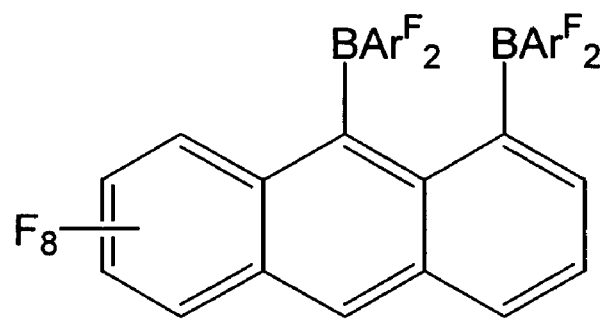
Figure 14:
Figure 15:
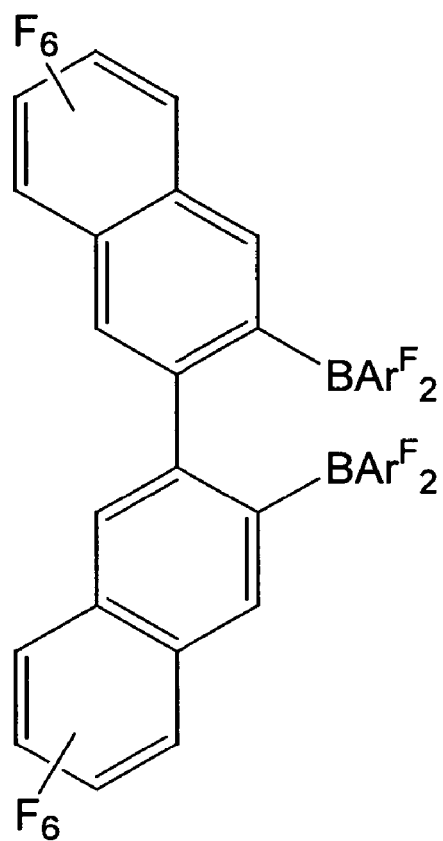

FIG. 9 is a schematic illustration of the chemical structure of representative dihydroanthracene compounds of the invention; a 1,8-bis(BAr$^F_2$)-10,10-disubstituted-hexafluorodihydroanthracene compound when X=CH$_2$; a 1,8-bis(BAr$^F_2$)-10,10-disubstituted-9-aza-hexafluorodihydroanthracene compound when X=NR; and a 1,8-bis(BAr$^F_2$)-10,10-disubstituted-9-oxo-hexafluorodihydroanthracene compound when X=O;

FIG. 10 is a schematic illustration of the chemical structure of a representative compound of the invention, a 1,2-bis(BAr$^F_2$)hexafluoronaphthalene compound;

FIG. 11 is a schematic illustration of the chemical structure of a representative compound of the invention, a 2,3-bis(BAr$^F_2$)hexafluoronaphthalene compound;

FIG. 12 is a schematic illustration of the chemical structure of a representative compound of the invention, a 2,3-bis(BAr$^F_2$)octafluoroanthracene compound;

FIG. 13 is a schematic illustration of the chemical structure of a representative compound of the invention, a 1,2-bis(BAr$^F_2$)octafluoroanthracene compound;

FIG. 14 is a schematic illustration of the chemical structure of a representative compound of the invention, a 1,9-bis(BAr$^F_2$)octafluoroanthracene compound; and FIG. 15 is a schematic illustration of the chemical structure of a representative compound of the invention, a 3,3'-bis(BAr$^F_2$)dodecafluoro-2,2'-binaphthalene compound.

DETAILED DESCRIPTION OF THE INVENTION

This invention generally provides a cationic-polymerization method that uses new coinitiators.

The following compounds can be used as cationic-polymerization coinitiators in the presence of water.

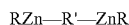  1)

wherein each R is independently selected from the group consisting of a perfluorophenyl; 3,5-bis(trifluoromethyl) phenyl; 1-perfluoronaphthyl; 2-perfluoronaphthyl; 2-perfluorobiphenyl; 3-perfluorobiphenyl; 4-perfluorobiphenyl; and p-R"$_3$Si-2,3,5,6-tetrafluorophenyl;

wherein R' is 1,2-perfluorophenylenyl; 1,2-perfluoronaphthalenyl; 2,3-perfluornapthalenyl; 1,8-perfluoronaphthalenyl; 1,2-perfluoroanthracenyl; 2,3-perfluoroanthracenyl; 1,9-perfluoroanthracenyl; 1,2-perfluorophenanthrenyl; 2,3-perfluorophenanthrenyl; 1,10-perfluorophenanthrenyl; 9,10-perfluorophenanthrenyl; 2,2'-perfluorobiphenylenyl; 2,2'-perfluoro-1,1'-binaphthalenyl; 3,3'-perfluoro-2,2'-binaphthalenyl; or 1,1'-ferrocenyl; and wherein R" is a C$_1$, C$_2$, C$_3$, C$_4$, C$_5$, C$_6$, C$_7$, C$_8$, C$_9$, or C$_{10}$ alkyl.

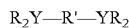  2)

wherein Y is boron or aluminum;
wherein R, R', and R" is as described above.

3)
4)
5)

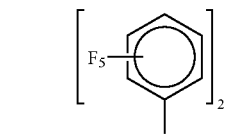  3)

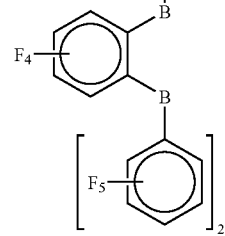  4)

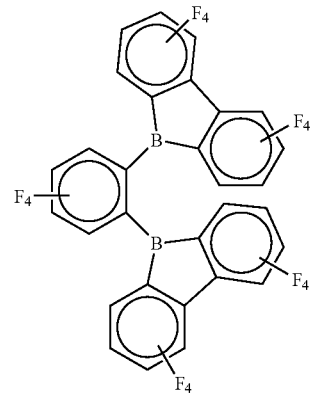  5)

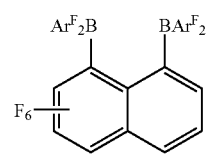

wherein Ar$^F$=C$_6$F$_5$ or Ar$^F_2$=C$_{12}$F$_8$

6)

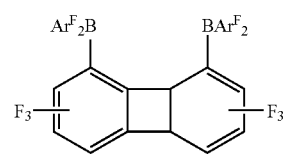

wherein Ar$^F$=C$_6$F$_5$ or Ar$^F_2$=C$_{12}$F$_8$

7)

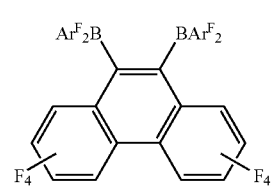

wherein Ar$^F$=C$_6$F$_5$ or Ar$^F_2$=C$_{12}$F$_8$

8)
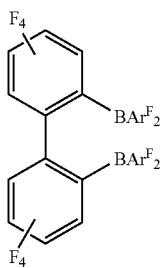
wherein $Ar^F = C_6F_5$ or $Ar^F_2 = C_{12}F_8$
9)
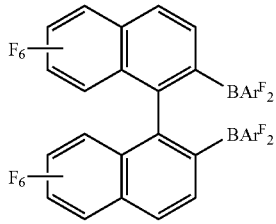
wherein $Ar^F = C_6F_5$ or $Ar^F_2 = C_{12}F_8$
10)
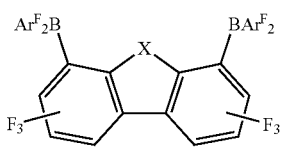
wherein X=CH$_2$, NR, or O
and $Ar^F = C_6F_5$ or $Ar^F_2 = C_{12}F_8$
11)
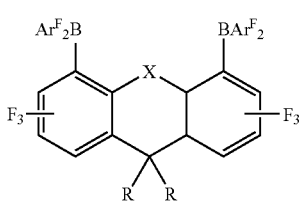
wherein X=CH$_2$, NR, or O
and $Ar^F = C_6F_5$ or $Ar^F_2 = C_{12}F_8$
12)
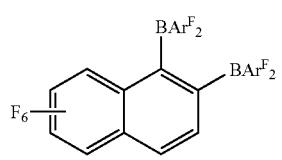
wherein $Ar^F = C_6F_5$ or $Ar^F_2 = C_{12}F_8$
13)
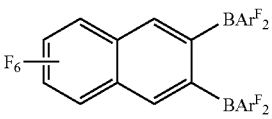
wherein $Ar^F = C_6F_5$ or $Ar^F_2 = C_{12}F_8$
14)
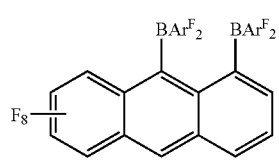
wherein $Ar^F = C_6F_5$ or $Ar^F_2 = C_{12}F_8$
15)
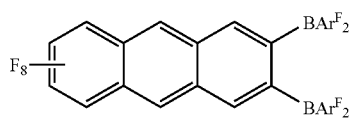
wherein $Ar^F = C_6F_5$ or $Ar^F_2 = C_{12}F_8$
16)
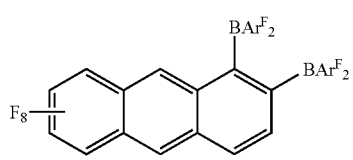
wherein $Ar^F = C_6F_5$ or $Ar^F_2 = C_{12}F_8$
17)
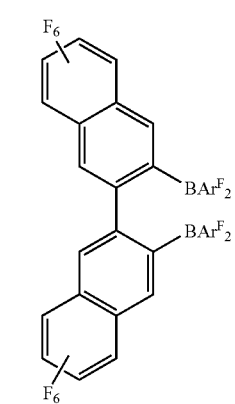
wherein $Ar^F = C_6F_5$ or $Ar^F_2 = C_{12}F_8$ There is no limitation on the cationically polymerizable olefin that can be used. In one embodiment, the olefin monomer(s) selected from $C_2$–$C_{30}$ olefins, $C_2$–$C_{30}$ diolefins, especially $C_2$–$C_{20}$ olefins. Representative examples of olefins that may be polymerized using the initiator of the present invention include ethylene, propylene, butene, pentene, hexene, heptene, octene, nonene, decene, dodecene, dodecyldocene, 3-methyl pentene, 3,5,5-trimethyl-hexene, isobutylene, 2-methyl-butene, 2-methyl-pentene, vinyl ether, vinyl carbazole and mixtures thereof. Diolefins may also be included. In one particular example, a mixture of isobutylene (i-butene) and about 0.5 to about 5 percent isoprene is cationically polymerized using the initiator of the present invention to produce butyl rubber. In another example, butyl rubber is produced by cationically polymerizing a mixture of isobutylene (i-butene) and about 0.5 to about 2.5 percent isoprene using the initiator of the present invention.

When the coinitiator is used in the presence of water, in one embodiment it is used in aqueous suspension. In another embodiment, the coinitiator is used an aqueous emulsion polymerzation process.

Useful amounts of the coinitiator can be determined by one having ordinary skill in the art without undue experimentation.

The present invention also provides a method of cationically polymerizing at least one cationically polymerizable olefin using an initiating system that includes 1,2-$C_6F_4$[B($C_6F_5$)$_2$]$_2$ (1-$F_4$). 1-$F_4$ may be synthesized according to the following scheme:

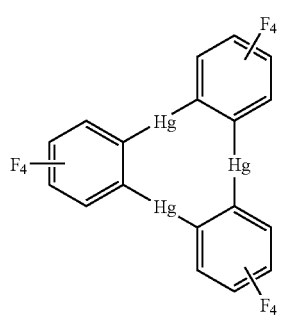

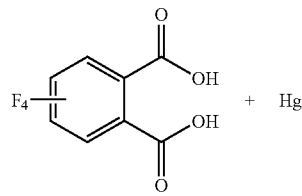

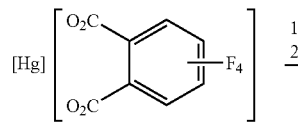

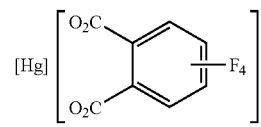

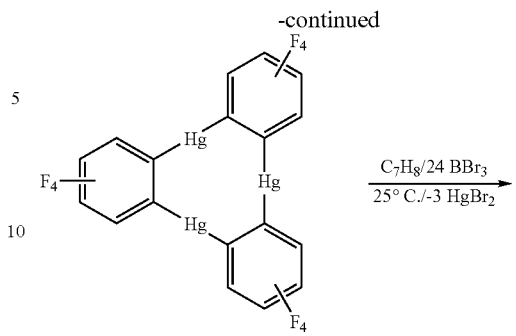

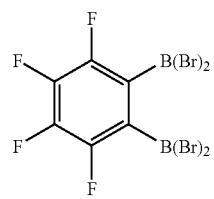

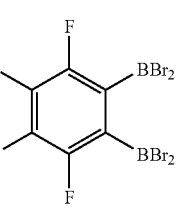

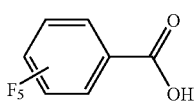

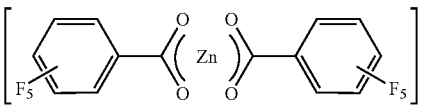

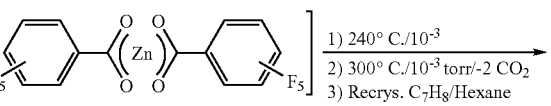

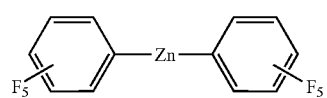

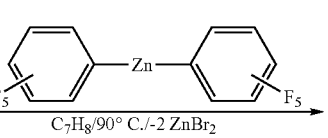

-continued

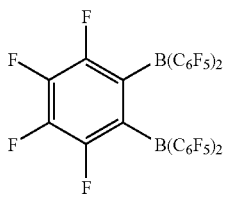

Preferably, the following reaction step:

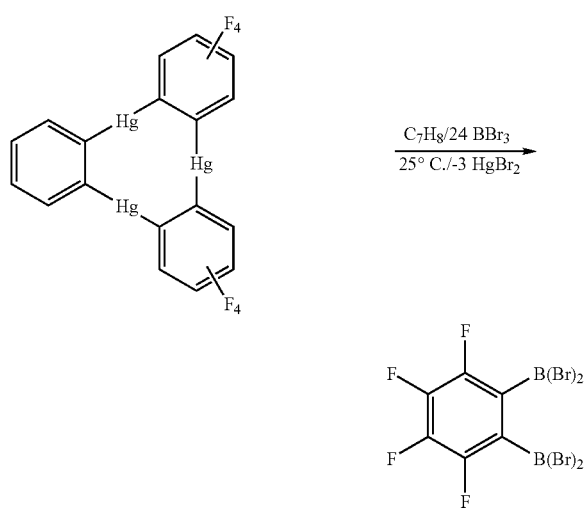

is preferred at a temperature of less than about 25° C. In another embodiment, the reaction is conducted at a temperature of less than about 35° C.

Figure 2:
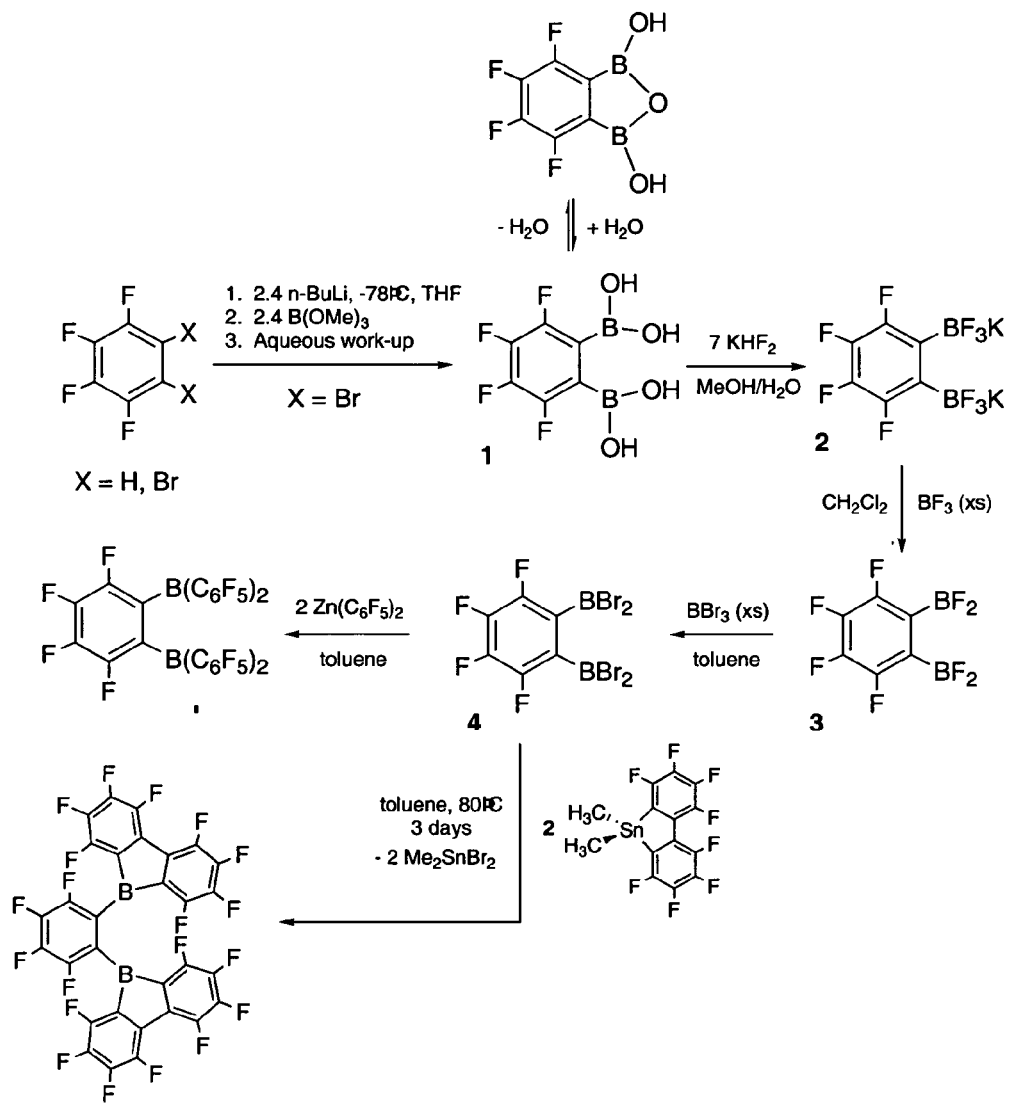
FIG. 2 is a schematic illustration of a representative method of the invention for synthesizing 1,2-bis(9-bora-1,2,3,4,5,6,7,8-octafluorofluorenyl)-3,4,5,6-tetrafluorobenzene.
Figure 3:
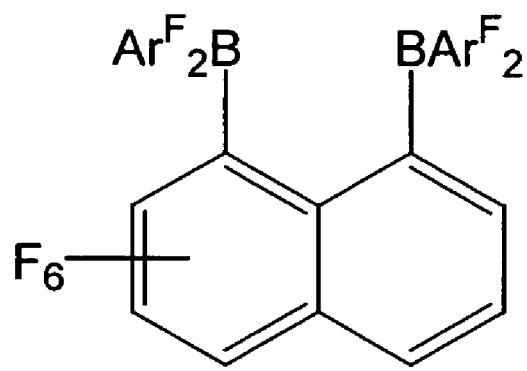
FIG. 3 is a schematic illustration of the chemical structure of a representative compound of the invention, a 1,8-bis(BAr$^F_2$)hexafluoronaphthalene compound.
Figure 4:
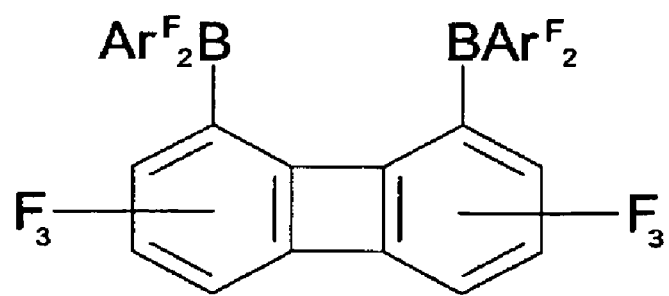
FIG. 4 is a schematic illustration of the chemical structure of a representative compound of the invention, a 1,8-bis(BAr$^F_2$)hexafluorobiphenylene compound.
Figure 5:
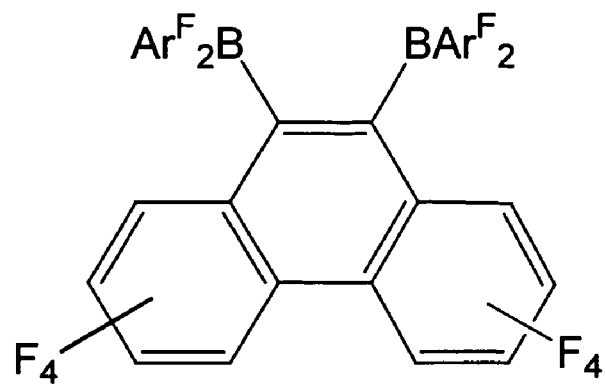
FIG. 5 is a schematic illustration of the chemical structure of a representative compound of the invention, a 9,10-bis(BAr$^F_2$)octafluorophenanthrene compound.
Figure 5:
Figure 6:
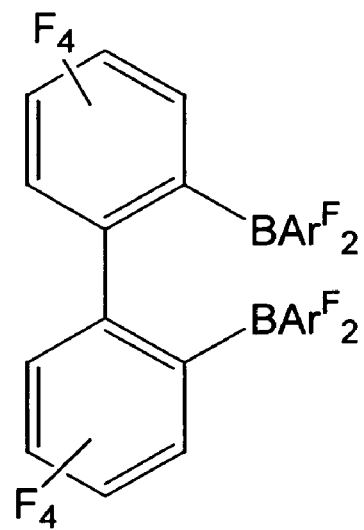
FIG. 6 is a schematic illustration of the chemical structure of a representative compound of the invention, a 2,2'-bis(BAr$^F_2$)octafluorobiphenyl compound.
Figure 7:
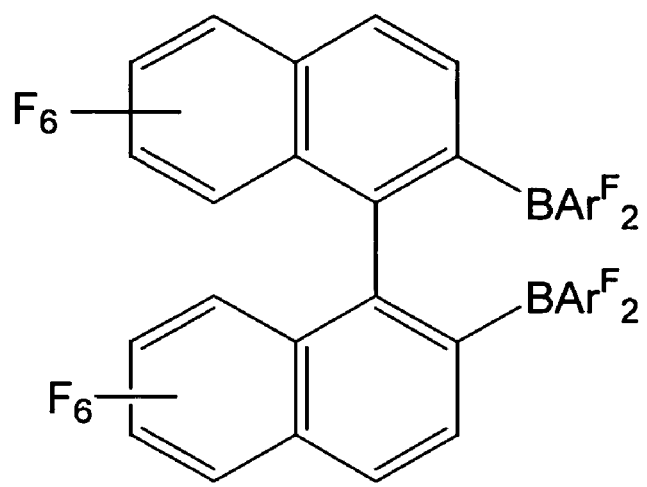
FIG. 7 is a schematic illustration of the chemical structure of a representative compound of the invention, a 2,2'-bis(BAr$^F_2$)dodecafluoro-1,1'-binaphthalene compound.
Figure 8:
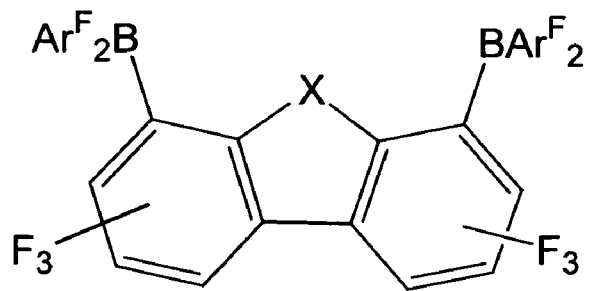
FIG. 8 is a schematic illustration of the chemical structure of representative compounds of the invention; a 1,8-bis(BAr$^F_2$)hexafluorofluorene compound when X=CH$_2$; a 1,8- bis(BAr$^F_2$)hexafluorocarbazole compound when X=NR; and a 1,8-bis(BAr$^F_2$)hexafluorodibenzofuran compound when X=O.

A schematic illustration of the syntheses of Compounds I and II is shown in FIG. 2.

Referring to FIG. 2, the synthetic route starts with tetrafluorodibromobenzene, which was converted to bis-boronic acid 1. The bis-boronic acid 1 was formed in good yield (75%) and then converted to the dipotassium salt of bis-trifluoroborate 2. Sequential treatment with boron trifluoride ($BF_3$) and then boron tribromide ($BBr_3$) converted bis-trifluoroborate 2 into bis-dibromoboryl compound 4, from which both Compounds I and II were prepared. Thus, the preparation of bis-dibromoboryl compound 4 constitutes a formal synthesis of Compounds I and II. The synthesis of Compound 1 is described in Example 1. The synthesis of Compound II is described in Example 2.

Thus, a method for making 1,2-bis(9-bora-1,2,3,4,5,6,7,8-octafluorofluorenyl)-3,4,5,6-tetrafluorobenzene (Compound I) is provided. In one embodiment, the synthetic method includes the following steps:

(a) reacting a 1,2-salt of 3,4,5,6-tetrafluorobenzene with a trialkylborate to provide a bis-boronic acid ester and hydrolyzing the bis-boronic acid ester to provide 1,2-bis[(dihydroxy)boryl]tetrafluorobenzene;

(b) reacting 1,2-bis[(dihydroxy)boryl]tetrafluorobenzene with a hydrogen difluoride salt to provide a tetrafluorophenyl-bis-1,2-trifluoroborate salt;

(c) reacting a tetrafluorophenyl-bis-1,2-trifluoroborate salt with boron trifluoride to provide 1,2-bis(difluoroboryl)tetrafluorobenzene;

(d) reacting 1,2-bis(difluoroboryl)tetrafluorobenzene with boron tribromide to provide 1,2-bis(dibromoboryl)tetrafluorobenzene; and (e) reacting 1,2-bis(dibromoboryl)tetrafluorobenzene with a 9-(dialkyltin) perfluorofluorene to provide 1,2-bis(9-bora-1,2,3,4,5,6,7,8-octafluorofluorenyl)-3,4,5,6-tetrafluorobenzene.

A method for making 1,2-bis[di(perfluorophenyl)boryl]-3,4,5,6-tetrafluorobenzene (Compound II) is also provided. In one embodiment, the method includes steps (a) through (d) above followed by reacting 1,2-bis(dibromoboryl)tetrafluorobenzene with di(perfluorophenyl)zinc, $Zn(C_6F_5)_2$, to provide 1,2-bis[di(perfluorophenyl)boryl]-3,4,5,6-tetrafluorobenzene.

In one embodiment of the above synthetic methods, the 1,2 salt of 3,4,5,6-tetrafluorobenzene is a 1,2-dilithium salt. In one embodiment, the 1,2-dilithium salt is made by reacting 1,2-dibromo-3,4,5,6-tetrafluorobenzene with n-butyl lithium.

In one embodiment of the above synthetic methods, the trialkylborate is trimethylborate. Suitable alkyl groups include any alkyl group that permits the reaction to proceed efficiently under convenient reaction conditions. Examples of suitable alkyl groups include C1–C12 alkyl groups.

In one embodiment of the above synthetic methods, the hydrogen difluoride salt is potassium hydrogen difluoride.

In one embodiment of the above synthetic methods, the tetrafluorophenyl-bis-1,2-trifluoroborate salt is potassium tetrafluorophenyl-bis-1,2-trifluoroborate.

In one embodiment of the method for making 1,2-[B$(C_{12}F_8)]_2C_6F_4$, the 9-(dialkyltin)perfluorofluorene is 9-(dimethyltin)perfluorofluorene. In another embodiment, the 9-(dialkyltin) perfluorofluorene is 9-(dibutyltin)perfluorofluorene.

Additionally, analogs of Compound I and Compound II, and methods for making the analogs are provided. Compounds I and II are 1,2-phenyl substituted compounds. Compound I includes a 1,2-phenyl "backbone" structure to which are covalently coupled two 9-bora-perfluorofluorenyl (i.e., —$B(C_{12}F_8)$) substituents. Similarly, Compound II includes a 1,2-phenyl "backbone" structure to which are covalently coupled two boryl di(perfluorophenyl) (i.e., —$B(C_6F_5)_2$) substituents. In addition to compounds having 1,2-phenyl backbone structures, the present invention provides compounds having other backbone structures. Representative backbone structures other than 1,2-phenyl backbone structures are illustrated in FIGS. 3–15. In FIGS. 3–15, $Ar^F$ represents a perfluoroaryl group. In these figures, the perfluoroaryl groups are represented as either $Ar^F$ is $C_6F_5$ (monovalent perfluorophenyl) or $Ar^F_2$ is $C_{12}F_8$ (divalent perfluorofluorene). It will be appreciated that other perfluoroaryl groups are within the scope of the invention.

Figure 1:
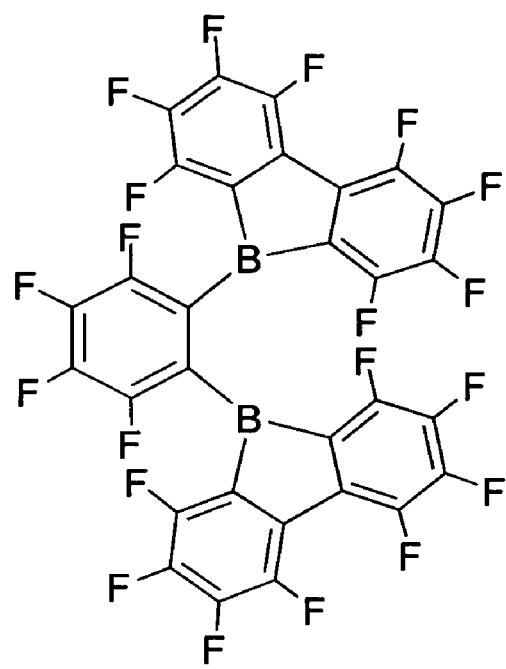
FIG. 1 is the chemical structure of 1,2-bis(9-bora-1,2,3,4,5,6,7,8-octafluorofluorenyl)-3,4,5,6-tetrafluorobenzene.

In one or more embodiments of this invention, the coinitiator compounds are aryl compounds that bear two boron centers directly bonded to a carbon atom of an aromatic ring of the aryl compound. As illustrated in FIGS. 1 and 3–15, the boron centers can be bonded to a monocyclic (see, for example, FIG. 1) or polycyclic aromatic (see, for example, FIGS. 3, 5, and 10–14). The boron centers can be bonded to the same ring of a polycyclic aromatic (see, for example, FIGS. 5 and 10–13). Alternatively, the boron centers can be bonded to different rings of a polycyclic aromatic (see, for example, FIGS. 3 and 14). In addition to monocyclic and polycyclic aromatic compounds, suitable backbone structures also include compounds having two aromatic rings (see, for example, FIGS. 4, 6–9, and 15). For these compounds, one boron center is bonded to a carbon atom of one aromatic ring and the second boron center is bonded to a carbon atom of a second aromatic ring.

The syntheses of Compounds I and II are illustrated in FIG. 2. By appropriate selection of the starting material (e.g., $C_6F_4X_2$ in FIG. 2), a variety of diborane and diborole compounds (e.g., the compounds illustrated in FIGS. 3–15) can be similarly prepared. In the synthetic method, an appropriate starting material (e.g., dihalo or hydrogen substituted aryl compound) is converted to a bis-boronic acid. The bis-boronic acid is then converted to the dipotassium salt of the bis-trifluoroborate. Sequential treatment with boron trifluoride ($BF_3$) and then boron tribromide ($BBr_3$) converts the bis-trifluoroborate into a bis-dibromoboryl compound, from which the final compounds can be prepared. The bis-dibromoboryl compound can be treated with the 9-(dimethyltin)perfluorofluorene to provide the corresponding 9-borafluorenyl compounds (i.e., diborole compounds). Alternatively, the bis-dibromoboryl compound can be treated with an appropriate organometallic reagent (e.g., di(perfluorophenyl)zinc) to provide the corresponding diboranes. Thus, a general synthetic methodology is provided for aryl compounds substituted with either two borole centers (i.e., aryl diborole) or two borane centers (i.e., aryl diborane).

In order to demonstrate the practice of the current invention, the following examples are presented.

EXAMPLES

All glassware was silanized with either $Me_2SiCl_2$ or Aquaphobe® and then dried in vacuo prior to use. Hexane, toluene and $CH_2Cl_2$ were pre-purified by passage through columns of activated A-2 alumina and Q-5 deoxo catalyst. Hexane and toluene were further distilled from potassium and sodium metal, respectively and stored over activated 4 Å molecular sieves. Nitrogen gas was dried by passing it through a column packed with a 1:1 v:v mixture of activated 3 Å molecular sieves and BASF R3-11 catalyst followed by a second column packed with alternating layers of 3 Å mol. sieves and SicaPent® indicator. IB gas was purified by passage through a column of 3 Å mol. sieves and BASF R3-11 catalyst prior to use. Bis(borane) 1-$F_4$ was prepared using modifications to the literature procedure and purified by recrystallization from toluene and hexane. Cumyl chloride (CuCl) was prepared by hydrochlorination of α-methylstyrene and degassed prior to use. 2,6-di-t-butyl-4-methylpyridine (DTBMP) was obtained from commercial sources and dried by azeotropic distillation of a toluene solution prior to use. Tris(perfluoro-phenyl)borane was obtained from commercial sources, purified by recrystallization from hexane solution, and was dried by storage of a toluene solution over activated 4 Å mol. sieves. Tris(perfluorophenylenemercury) was prepared by decarboyxlation of mercury perfluorophthalate as described in P. Sartori et al. *Chem. Ber.* 1968, 101, 2004–9 while bis(perfluorophenyl) zinc was prepared by decarboxylation of zinc perfluorobenzoate as described in P. Sartori et al. *Chem. Ber.* 1967, 100, 3016–23. Bis(borane)o-$C_6F_4[B(C_6F_5)_2]_2$(1$F_4$) was prepared with modifications to the literature method (Williams et al. *J. Am. Chem. Soc* 1999, 121, 3244–3245) and purified by recrystallization from toluene and hexane. Triphenylmethyl tetrakis(perfluorophenyl)borate was prepared from the corresponding lithium salt and triphenylmethyl chloride and purified as described in the literature (Chien, J. C. W.; Tsai, W. M.; Rausch, M. D. *J. Am. Chem. Soc.* 1991, 113, 8570–1). Lithium tetrakis(perfluoropheny)borate was purchased from commercial sources and used without purification while [(Et_2O)_2H][B(C_6F_5)_4] was prepared from [Li] [B(C_6F_5)_4] as described in Jutzi, P.; Mueller, C.; Stammler, A.; Stammler, H.-G. *Organometallics* 2000, 19, 1442–1444.

Dodecyltrimethylammonium bromide and sodium dodecyl sulfate were obtained from commercial sources and used without purification. Dodecyltrimethylammonium triflate and tetrafluoroborate were prepared from the bromide on treatment with an aqueous solution of silver triflate or silver tetrafluoroborate, respectively. A stock solution of LiCl (121.4 g, 2.86 mole) and NaCl (6.33 g, 0.108 mole) in $H_2O$ (400 g, 22.20 mole) (hereinafter referred to as anti-freeze solution) (Akopov, E.; *Ah. Prikl. Kim.* 1963, 36, 1916–1919) was prepared and was used for most of the polymerization experiments in aqueous suspension or emulsion summarized below. In selected cases, 38 wt % aqueous sulfuric acid or 48 wt % aqueous fluoroboric acid were used instead of anti-freeze solution.

Synthesis of 1,2-Bis(dibromoboryl)tetrafluorobenzene

To a 100 mL round bottom single neck flask containing a magnetic stir bar was charged 2.08 g ($1.99 \times 10^{-3}$ mol) tris(perfluoro-o-phenylenemercury) inside a glove box. The flask was next fitted with an air-free style adapter featuring 24/40 outer and inner members connected via an in-line PTFE vacuum stopcock and subsequently attached to a vacuum line with traps pre-charged with 5 wt % KOH in isopropanol. Next, 50 mL dry benzene followed by 12.0 g ($4.77 \times 10^{-2}$ mol) $BBr_3$ were vacuum transferred to the flask containing the tris(perfluoro-o-phenylenemercury). The reaction mixture was then stirred for 24 hours at room temperature under vacuum and then brought into the glove box. Next, the reaction mixture was directly filtered into a tared Carius tube through a frit attached to the 24/40 neck of an air-free style adapter sealed to the Carius tube. The Carius tube was then affixed to the vacuum line and its contents were place under dynamic vacuum to effect removal of volatiles. This resulted in the production of 2.63 g (90% yield) of a light brown crystalline product. $^{19}F$ NMR spectroscopy showed this material to be >95% pure. $^{19}F$ NMR (benzene-$d_6$, 300K, 300 MHz): d-126.21 (d, 2F, o-$C_6F_5$), -147.79 (d, 2F, m-$C_6F_4$).

Synthesis of 1,2-Bis[bis(pentafluorophenyl)boryl]tetrafluorobenzene

To the Carius tube containing 2.63 g ($5.38 \times 10^{-3}$ mol) 1,2-Bis(dibromoboryl) tetrafluorobenzene was added 4.50 g ($1.13 \times 10^{-2}$ mol) bis(pentafluorophenyl)zinc and 75 mL dried toluene inside a glove box resulting in the production of a chartreuse colored reaction mixture and the production of a grey precipitate. The tube was then affixed to a vacuum line and subjected to three consecutive freeze/pump/thaw cycles after which the contents were heated to 111° C. for 12 hours. The cooled reaction mixture was then filtered into a 250 mL single neck round bottom flask fitted with a filter frit inside the glove box after which the frit was replaced with an adjustable 24/40 gas inlet adapter. The flask was then connected to a Schlenk line and placed under dynamic vacuum to affect removal of the volatiles to yield a lightly yellow solid. This material was then recrystallized several times from a 60/40 vol/vol mixture of toluene and hexane to give 4.01 g (89%) white crystals. $^{19}F$ NMR spectroscopy showed this material to be >99% pure. $^{19}F$ NMR (CDCl$_3$, 300K, 282 MHz) d-124.41 (d, 2F, o-$C_6F_4$), -126.0 (d, 8F, o-$C_6F_5$), -141.30 (t, 4F, p-$C_6F_5$), -147.74 (d, 2F, m-$C_6F_4$), -160.26 (m, 8F, m-$C_6F_5$).

POLYMERIZATION EXAMPLES

Example 1

Polymerization of IB in Liquid Monomer

IB was condensed at −78° C. into a graduated cylinder under $N_2$ on a vacuum line. Twelve mL was then vacuum transferred into a rb flask containing about 1 g of tri-n-octylaluminum. After stirring for 30 min at −78° C., the monomer was vacuum transferred to a second rb flask equipped with a septum inlet. A toluene solution of 1-$F_4$ (0.048 mL of 0.05 M solution, final concentration 0.20 mM) was added to the rapidly stirred monomer via gas-tight syringe at −78° C. An uncontrolled, exothermic polymerization occurred which was accompanied by rapid gelation of the solution and cessation of stirring. After quenching with 1 mL 0.2M $NaOCH_3$ in methanol, all volatiles were removed and the residue was washed with methanol prior to being taken up in hexane. The resultant polymer solution was filtered, concentrated to dryness, and dried in a vacuum oven at 30 in Hg at 90° C. for 24 h. Yield and characterization data are summarized in the Table. Under the same conditions, but in the presence of 2–20 mM DTBP, little to no PIB is formed thus implicating initiation by protic impurities.

Example 2

Co-Polymerization of IB with Isoprene in Liquefied Monomer

IB was condensed at −78° C. into a graduated cylinder under $N_2$ on a vacuum line. About 12 mL was then vacuum transferred into a rb flask containing about 1 g of tri-n-octylaluminum and 0.18 mL of isoprene. After stirring for 30 min at −78° C., the monomer and isoprene were vacuum transferred to a second rb flask equipped with a septum inlet. A toluene solution of 1-$F_4$ (0.048 mL of 0.05 M solution, final concentration 0.20 mM) was added to the rapidly stirred monomer solution via gas-tight syringe. An uncontrolled, violently exothermic polymerization occurred which was accompanied by rapid gelation of the solution and cessation of stirring. The polymerization was halted as described in Example 1 after one hour at −78° C. Polymer was isolated as described in Example 1 and 6.67 g of butyl rubber (76% conversion) was obtained with $M_w$=71.1 K and $M_w/M_n$=2.08. A $^1H$ NMR spectrum of this material revealed the presence of about 2 mol % trans-1,4-isoprene units.

Examples 3–5

Polymerization of IB in Hexane Solution

IB was condensed at −78° C. into a graduated cylinder under $N_2$ on a vacuum line. About five mL was then vacuum transferred into a rb flask containing about 1 g of tri-n-octylaluminum and 19 mL of hexane. After stirring for 30 min at −78° C., the monomer and solvent were vacuum transferred to a second rb flask equipped with a septum inlet. A toluene solution of 1-$F_4$ (0.766 mL of 0.065 M solution, final concentration 2.0 mM) was added to the rapidly stirred monomer solution via gas-tight syringe. A controlled polymerization occurred which was quenched as described in Example 1 after one hour at −78° C. Polymer was isolated as described in Example 1 and results are summarized in the Table.

Example 6

Polymerization of IB in Hexane Solution in the Presence of Low Concentrations of 1-$F_4$ IB was condensed at −78° C. into a graduated cylinder under $N_2$ on a vacuum line. About five mL was then vacuum transferred into a rb flask containing about 1 g of tri-n-octylaluminum and 19 mL of hexane. After stirring for 30 min at −78° C., the monomer and solvent were vacuum transferred to a second rb flask equipped with a septum inlet. A toluene solution of 1-$F_4$ (0.766 mL of 0.065 mM solution, final concentration $2.0 \times 10^{-6}$ M) was added to the rapidly stirred monomer solution via gas-tight syringe. A controlled polymerization occurred which was quenched as described in Example 1 after one hour at −78° C. Polymer was isolated as described in Example 1 to provide 117 mg of PIB (3.0% conversion) with $M_w$=483 K and $M_w/M_n$=1.90.

In a separate experiment, a solution of IB and hexane of the same composition and prepared in the same manner was titrated with a stock solution of benzophenone ketyl in xylenes/tetraglyme to a pale blue end point. In this manner the concentration of dissolved water was estimated to be $2.5 \times 10^{-5}$ M or roughly 10× higher than the amount of 1-$F_4$ used in the above experiment.

Comparative Example 1

Using the procedure summarized in Examples 2–4, a toluene solution of $B(C_6F_5)_3$ (0.80 mL of 0.126 M, final concentration 4.0 mM) was added to a hexane solution of IB. After 1 hour at −78° C., work-up as described above provided trace quantities of PIB; properties are summarized in the Table.

Examples 7–10

Polymerization of IB in Hexane Solution in the Presence of CumCl and DTBP

The procedure of examples 2–4 was followed. Prior to the addition of 1-$F_4$, a hexane solution of DTBP (1.0 mL of 0.5 M) and cumyl chloride (0.172 mL of 0.029 M in $CH_2Cl_2$) were added to a solution of IB in hexane at −78° C., followed by the addition of 1-$F_4$ as described in Example 2. A controlled polymerization occurred which was worked up after 1 h as in Example 1 and the results are summarized in the Table.

Comparative Example 2

Using the procedure summarized in Examples 5–8, a toluene solution of $B(C_6F_5)_3$ (0.80 mL of 0.126 M, final concentration 4.0 mM) was added to a solution of IB, cumyl chloride and DTBP in hexane. After 1 hour at −78° C., work-up as described above failed to provide detectable quantities of PIB.

TABLE

Polymerization of i-Butene in Hexane Solution at −78° C.

| Example | 1-$F_4$ (mM) | CumCl (mM) | IB (M) | DTBP (mM) | $M_w$ (K) | PDI | Yield (%) |
|---|---|---|---|---|---|---|---|
| 1 | 0.20 | 0 | 14.6[a] | 0 | 69.0 | 3.16 | 100 |
| 3 | 0.64 | 0 | 0.56 | 0 | 97.8 | 2.22 | 100 |
| 4 | 2.00 | 0 | 3.3 | 0 | 195 | 3.18 | 100 |
| 5 | 2.00 | 0 | 3.3 | 0 | 258 | 2.38 | 100 |
| $B(C_6F_5)_3$ (4 mM) | 0 | 0 | 3.3 | 0 | 96.8 | 1.75 | 0.10 |
| 7 | 2.00 | 0.20 | 2.8 | 20 | 393 | 2.06 | 22 |
| 8 | 2.00 | 0.30 | 2.8 | 20 | 255 | 1.92 | 21 |
| 9 | 2.00 | 0.20 | 2.8 | 2 | 779 | 2.11 | 93 |
| 10 | 2.00 | 0.20 | 3.3 | 20 | 361 | 1.72 | 42 |
| $B(C_6F_5)_3$ (4 mM) | 0 | 0.20 | 3.3 | 20 | — | — | 0 |

[a]Liquid i-butene.

Example 10

Polymerization of IB in Aqueous Suspension

Eighteen mL of anti-freeze solution was added to a 3 neck rb flask equipped with an over-head mechanical stirrer. Isobutene (18 mL) was condensed at −60° C. into this flask under static vacuum. The mixture was stirred at 550 rpm under $N_2$ while adding 10.0 mL of a solution of 1-$F_4$ in hexane (1.19 mM) over a period of 5 min by syringe. During this period the mixture turned milky white in appearance. After 1 h at −60° C., the mixture was allowed to warm to 25° C. while venting the flask to the air. The mixture was diluted with water (100 mL) and $CH_2Cl_2$ (50 mL) and transferred to a separatory funnel. The aqueous phase was extracted with $CH_2Cl_2$ (2' 50 mL) and the organic extracts were dried over $MgSO_4$, filtered washing with additional $CH_2Cl_2$ and concentrated to dryness in vacuo. Poly(isobutene) (6.10 g, 48% conversion) was obtained with $M_w$=66.1 K and $M_w/M_n$=2.55.

Example 11

Polymerization of IB in Aqueous Suspension in the Presence of a Polar Solvent Eighteen mL of anti-freeze solution and 9.0 mL of $CH_2Cl_2$ were added to a 3 neck rb flask equipped with an over-head mechanical stirrer. Isobutene (9.0 mL) was condensed at −60° C. into this flask under static vacuum. The mixture was stirred at 550 rpm under $N_2$ while adding 10.0 mL of a solution of 1-$F_4$ in hexane (1.19 mM) over a period of 5 min by syringe. During this period the mixture turned milky white in appearance. After 1 h at −60° C., the mixture was allowed to warm to 25° C. while venting the flask to the air. The mixture was diluted with water (100 mL) and $CH_2Cl_2$ (50 mL) and transferred to a separatory funnel. The aqueous phase was extracted with $CH_2Cl_2$(2' 50 mL) and the organic extracts were dried over $MgSO_4$, filtered washing with additional $CH_2Cl_2$ and concentrated to dryness in vacuo. Poly(isobutene) (2.05 g, 32% conversion) was obtained with $M_w$=121 K and $M_w/M_n$=1.96.

Example 12

Polymerization of IB in Aqueous Suspension

Eighteen mL of anti-freeze solution were added to a 3 neck rb flask equipped with an over-head mechanical stirrer. Isobutene (18.0 mL) was condensed at −60° C. into this flask under static vacuum. The mixture was stirred at 550 rpm under $N_2$ while adding 1.00 mL of a solution of 1-$F_4$ in toluene (11.9 mM) over a period of 5 sec by syringe. During the addition of 1-$F_4$ the charge turned yellow and remained so for 10 sec before finally becoming milky white in appearance. The reaction was vigorously exothermic as witnessed by refluxing of the monomer. After 1 h at −60° C., the mixture was allowed to warm to 25° C. while venting the flask to the air. The mixture was diluted with water (100 mL) and $CH_2Cl_2$ (50 mL) and transferred to a separatory funnel. The aqueous phase was extracted with $CH_2Cl_2$ (2 ' 50 mL) and the organic extracts were dried over $MgSO_4$, filtered washing with additional $CH_2Cl_2$ and concentrated to dryness in vacuo. Poly(isobutene) (4.95 g, 39% conversion) was obtained with $M_w$=23.9 K and $M_w/M_n$=2.38.

Example 13

Polymerization of IB in Aqueous Emulsion

Eighteen mL of anti-freeze solution and 0.100 g of dodecyltrimethylammonium bromide were added to a 3 neck rb flask equipped with an over-head mechanical stirrer. Isobutene (18.0 mL) was condensed at −60° C. into this flask under static vacuum. The mixture was stirred at 550 rpm under $N_2$ while adding 1.00 mL of a solution of 1-$F_4$ in hexane (11.9 mM) over a period of 5 sec by syringe. The reaction was vigorously exothermic as witnessed by refluxing of the monomer. After 1 h at −60° C., the mixture was allowed to warm to 25° C. while venting the flask to the air. The mixture was diluted with water and methanol (100 mL of 1:1 v:v) to break the emulsion and $CH_2Cl_2$ (50 mL) and transferred to a separatory funnel. The aqueous phase was extracted with $CH_2Cl_2$ (2 ' 50 mL) and the organic extracts were dried over $MgSO_4$, filtered washing with additional $CH_2Cl_2$ and concentrated to dryness in vacuo. Poly (isobutene) (595 mg, 4.7% conversion) was obtained with $M_w$=57.2 K and $M_w/M_n$=2.74.

Example 14

Polymerization of IB in Aqueous Emulsion

Eighteen mL of anti-freeze solution and 0.100 g of sodium dodecyl sulfate (SDS) were added to a 3 neck rb flask equipped with an over-head mechanical stirrer. Isobutene (18.0 mL) was condensed at −60° C. into this flask under static vacuum. The mixture was stirred at 550 rpm under $N_2$ while adding 1.00 mL of a solution of 1-$F_4$ in toluene (11.9 mM) over a period of 5 sec by syringe. During the addition of 1-F$_4$ the charge turned yellow and remained so for 10 sec before finally becoming milky white in appearance. The reaction was vigorously exothermic as witnessed by refluxing of the monomer. After 1 h at −60° C., the mixture was allowed to warm to 25° C. while venting the flask to the air. The mixture was diluted with water and methanol (100 mL of 1:1 v:v) to break the emulsion and CH$_2$Cl$_2$ (50 mL) and transferred to a separatory funnel. The aqueous phase was extracted with CH$_2$Cl$_2$ (2 ' 50 mL) and the organic extracts were dried over MgSO$_4$, filtered washing with additional CH$_2$Cl$_2$ and concentrated to dryness in vacuo. Poly (isobutene) (4.10 g, 32% conversion) was obtained with $M_w$=25.4 K and $M_w/M_n$=2.37.

Example 15

Copolymerization of IB and Isoprene in Aqueous Suspension

Eighteen mL of anti-freeze solution and 2.0 mL of isoprene were added to a 3 neck rb flask equipped with an over-head mechanical stirrer. Isobutene (18.0 mL) was condensed at −60° C. into this flask under static vacuum. The mixture was stirred at 550 rpm under N$_2$ while adding 1.00 mL of a solution of 1-F$_4$ in toluene (11.9 mM) over a period of 5 sec by syringe. During the addition of 1-F$_4$ the charge turned yellow and remained so for 20 sec before finally becoming milky white in appearance. The reaction was vigorously exothermic as witnessed by refluxing of the monomer. After 1 h at −60° C., the mixture was allowed to warm to 25° C. while venting the flask to the air. The mixture was diluted with water (100 mL) and CH$_2$Cl$_2$ (50 mL) and transferred to a separatory funnel. The aqueous phase was extracted with CH$_2$Cl$_2$ (2 ' 50 mL) and the organic extracts were dried over MgSO$_4$, filtered washing with additional CH$_2$Cl$_2$ and concentrated to dryness in vacuo. Butyl rubber (3.35 g, 24% conversion) was obtained with $M_w$=86.2 K and $M_w/M_n$=2.89. A $^1$H NMR spectrum revealed the presence of ca. 5 mol % trans-1,4-isoprene units.

Example 16

Copolymerization of IB and Isoprene in Aqueous Emulsion

Eighteen mL of anti-freeze solution, 2.0 mL of isoprene, and 0.100 g of SDS were added to a 3 neck rb flask equipped with an over-head mechanical stirrer. Isobutene (18.0 mL) was condensed at −60° C. into this flask under static vacuum. The mixture was stirred at 550 rpm under N$_2$ while adding 1.00 mL of a solution of 1-F$_4$ in toluene (11.9 mM) over a period of 5 sec by syringe. During the addition of 1-F$_4$ the charge turned yellow and remained so for 20 sec before finally becoming milky white in appearance. The reaction was vigorously exothermic as witnessed by refluxing of the monomer. After 1 h at −60° C., the mixture was allowed to warm to 25° C. while venting the flask to the air. The mixture was diluted with water and methanol (100 mL of 1:1 v:v) to break the emulsion and CH$_2$Cl$_2$ (50 mL) and transferred to a separatory funnel. The aqueous phase was extracted with CH$_2$Cl$_2$ (2 ' 50 mL) and the organic extracts were dried over MgSO$_4$, filtered washing with additional CH$_2$Cl$_2$ and concentrated to dryness in vacuo. Butyl rubber (2.49 g, 18% conversion) was obtained with $M_w$=77.3 K and $M_w/M_n$=2.75. A $^1$H NMR spectrum revealed the presence of ca. 5 mol % trans-1,4-isoprene units.

Example 17

Polymerization of IB in Aqueous Sulfuric Acid Suspension

Eighteen mL of 38 wt % sulfuric acid solution were added to a 3 neck rb flask equipped with an over-head mechanical stirrer. Isobutene (18.0 mL) was condensed at −60° C. into this flask under static vacuum. The mixture was stirred at 550 rpm under N$_2$ while adding 1.00 mL of a solution of 1-F$_4$ in toluene (11.9 mM) over a period of 5 sec by syringe. During the addition of 1-F$_4$ the charge turned yellow and remained so for 10 sec before finally becoming milky white in appearance. The reaction was vigorously exothermic as witnessed by refluxing of the monomer. After 1 h at −60° C., the mixture was allowed to warm to 25° C. while venting the flask to the air. The mixture was diluted with water (100 mL) and CH$_2$Cl$_2$ (50 mL) and transferred to a separatory funnel. The aqueous phase was extracted with CH$_2$Cl$_2$ (2 ' 50 mL) and the organic extracts were dried over MgSO$_4$, filtered washing with additional CH$_2$Cl$_2$ and concentrated to dryness in vacuo. Poly(isobutene) (3.67 g, 29% conversion) was obtained with $M_w$=38.4 K and $M_w/M_n$=2.05.

Example 18

Polymerization of IB in Aqueous Sulfuric Acid Emulsion

Eighteen mL of 38 wt % sulfuric acid solution and 0.100 g of dodecyltrimethylammonium triflate were added to a 3 neck rb flask equipped with an over-head mechanical stirrer. Isobutene (18.0 mL) was condensed at −60° C. into this flask under static vacuum. The mixture was stirred at 550 rpm under N$_2$ while adding 1.00 mL of a solution of 1-F$_4$ in toluene (11.9 mM) over a period of 5 sec by syringe. During the addition of 1-F$_4$ the charge turned yellow and remained so for 10 sec before finally becoming milky white in appearance. The reaction was vigorously exothermic as witnessed by refluxing of the monomer. After 1 h at −60° C., the mixture was allowed to warm to 25° C. while venting the flask to the air. The mixture was diluted with water and methanol (100 mL of 1:1 v:v) to break the emulsion and CH$_2$Cl$_2$ (50 mL) and transferred to a separatory funnel. The aqueous phase was extracted with CH$_2$Cl$_2$ (2' 50 mL) and the organic extracts were dried over MgSO$_4$, filtered washing with additional CH$_2$Cl$_2$ and concentrated to dryness in vacuo. Poly(isobutene) (1.82 g, 14% conversion) was obtained with $M_w$=55.7 K and $M_w/M_n$=2.82.

Example 19

Polymerization of IB in Aqueous Fluoroboric Acid Suspension

Eighteen mL of 48 wt % fluoroboric acid solution were added to a 3 neck rb flask equipped with an over-head mechanical stirrer. Isobutene (18.0 mL) was condensed at −80° C. into this flask under static vacuum. The mixture was stirred at 550 rpm under N$_2$ while adding 1.00 mL of a solution of 1-F$_4$ in toluene (11.9 mM) over a period of 5 sec by syringe. During the addition of 1-F$_4$ the charge turned yellow and remained so during the entire course of the polymerization although the intensity of the color gradually decreased with increasing time. The reaction was vigorously exothermic as witnessed by refluxing of the monomer. After 1 h at −80° C., the mixture was allowed to warm to 25° C.

while venting the flatus to the air. The mixture was diluted with water (100 mL) and $CH_2Cl_2$ (50 mL) and transferred to a separatory funnel. The aqueous phase was extracted with $CH_2Cl_2$ (2 ' 50 mL) and the organic extracts were dried over $MgSO_4$, filtered washing with additional $CH_2Cl_2$ and concentrated to dryness in vacuo. Poly(isobutene) (7.28 g, 58% conversion) was obtained with $M_w$=50.8 K and $M_w/M_n$=2.36.

Example 20

Polymerization of IB in Aqueous Fluoroboric Acid Emulsion

Eighteen mL of 48 wt % fluoroboric acid solution and 0.100 g of dodecyltrimethylammonium tetrafluoroborate were added to a 3 neck rb flask equipped with an overhead mechanical stirrer. Isobutene (18.0 mL) was condensed at −80° C. into this flask under static vacuum. The mixture was stirred at 550 rpm under $N_2$ while adding 1.00 mL of a solution of 1-$F_4$ in toluene (11.9 mM) over a period of 5 sec by syringe. During the addition of 1-$F_4$ the charge turned yellow and remained so for 10 min before finally becoming milky white in appearance The reaction was vigorously exothermic as witnessed by refluxing of the monomer. After 1 h at −80° C., the mixture was allowed to warm to 25° C. while venting the flask to the air. The mixture was diluted with water and methanol (100 mL of 1:1 v:v) to break the emulsion and $CH_2Cl_2$ (50 mL) and transferred to a separatory funnel. The aqueous phase was extracted with $CH_2Cl_2$ (2' 50 mL) and the organic extracts were dried over $MgSO_4$, filtered washing with additional $CH_2Cl_2$ and concentrated to dryness in vacuo. Poly(isobutene) (6.57 g, 52% conversion) was obtained with $M_w$=39.9 K and $M_w/M_n$=2.12.

Example 21

Copolymerization of IB and Isoprene in Aqueous Fluoroboric Acid Emulsion

Eighteen mL of 48 wt % fluoroboric acid solution, 8.0 mL hexane, 0.100 g of dodecyltrimethylammonium tetrafluoroborate, and 1.0 mL of isoprene were added to a 3 neck rb flask equipped with an over-head mechanical stirrer. Isobutene (9.0 mL) was condensed at −80° C. into this flask under static vacuum. The mixture was stirred at 550 rpm under $N_2$ while adding 1.00 mL of a solution of 1-$F_4$ in toluene (11.9 mM) over a period of 5 sec by syringe. During the addition of 1-$F_4$ the charge turned yellow and remained so during the entire course of the polymerization although the intensity of the color gradually decreased with increasing time. The reaction was vigorously exothermic as witnessed by refluxing of the monomer. After 1 h at −80° C., the mixture was allowed to warm to 25° C. while venting the flask to the air. The mixture was diluted with water (100 mL) and $CH_2Cl_2$ (50 mL) and transferred to a separatory funnel. The aqueous phase was extracted with $CH_2Cl_2$ (2' 50 mL) and the organic extracts were dried over $MgSO_4$, filtered washing with additional $CH_2Cl_2$ and concentrated to dryness in vacuo. Butyl rubber (2.76 g, 39% conversion) was obtained with $M_w$=80.9 K and $M_w/M_n$=2.90. A $^1$H NMR spectrum revealed the presence of ca. 14 mol % trans-1,4-isoprene units.

Example 22

Copolymerization of IB and Isoprene in Aqueous Fluoroboric Acid Suspension

Eighteen mL of 48 wt % fluoroboric acid solution, 8.0 mL hexane, and 1.0 mL of isoprene were added to a 3 neck rb flask equipped with an over-head mechanical stirrer. Isobutene (9.0 mL) was condensed at −80° C. into this flask under static vacuum. The mixture was stirred at 550 rpm under $N_2$ while adding 1.00 mL of a solution of 1-$F_4$ in toluene (11.9 mM) over a period of 5 sec by syringe. During the addition of 1-$F_4$ the charge turned yellow and remained so for 10 min before finally becoming milky white in appearance The reaction was vigorously exothermic as witnessed by refluxing of the monomer. After 1 h at −80° C., the mixture was allowed to warm to 25° C. while venting the flask to the air. The mixture was diluted with water and methanol (100 mL of 1:1 v:v) to break the emulsion and $CH_2Cl_2$ (50 mL) and transferred to a separatory funnel. The aqueous phase was extracted with $CH_2Cl_2$ (2' 50 mL) and the organic extracts were dried over $MgSO_4$, filtered washing with additional $CH_2Cl_2$ and concentrated to dryness in vacuo. Butyl rubber (2.67 g, 38% conversion) was obtained with $M_w$=106 K and $M_w/M_n$=1.91. A $^1$H NMR spectrum revealed the presence of ca. 15 mol % trans-1,4-isoprene units.

Example 23

Polymerization of IB in Aqueous Suspension Coinitiated by 1,2-$C_6F_4$(9-$BC_{12}F_8$)$_2$ Eighteen mL of anti-freeze solution were added to a 3 neck rb flask equipped with an over-head mechanical stirrer. Isobutene (18.0 mL) was condensed at −60° C. into this flask under static vacuum. The mixture was stirred at 550 rpm under $N_2$ while adding 1.00 mL of a solution of 1,2-$C_6F_4$(9-$BC_{12}F_8$)$_2$ in toluene (11.9 mM) over a period of 5 sec by syringe. During the addition of this solution the charge turned yellow and remained so for 10 sec before finally becoming milky white in appearance. The reaction was vigorously exothermic as witnessed by refluxing of the monomer. After 1 h at −60° C., the mixture was allowed to warm to 25° C. while venting the flask to the air. The mixture was diluted with water (100 mL) and $CH_2Cl_2$ (50 mL) and transferred to a separatory funnel. The aqueous phase was extracted with $CH_2Cl_2$ (2 ' 50 mL) and the organic extracts were dried over $MgSO_4$, filtered washing with additional $CH_2Cl_2$ and concentrated to dryness in vacuo. Poly(isobutene) (5.04 g, 40% conversion) was obtained with $M_w$=89.6 K and $M_w/M_n$=3.83.

Example 24

Polymerization of IB in Aqueous HCl Suspension

Eighteen mL of 12 N HCl (aq) were added to a 3 neck rb flask equipped with an overhead mechanical stirrer. Isobutene (18.0 mL) was condensed at −25° C. into this flask under static vacuum. The mixture was stirred at 550 rpm under $N_2$ while adding 1.00 mL of a solution of 1-$F_4$ in toluene (11.9 mM) over a period of 5 sec by syringe. The reaction was vigorously exothermic as witnessed by refluxing of the monomer. After 1 h at −25° C., the mixture was allowed to warm to 25° C. while venting the flask to the air.

The mixture was diluted with water (100 mL) and CH$_2$Cl$_2$ (50 mL) and transferred to a separatory funnel. The aqueous phase was extracted with CH$_2$Cl$_2$ (2 ' 50 mL) and the organic extracts were dried over MgSO$_4$, filtered washing with additional CH$_2$Cl$_2$ and concentrated to dryness in vacuo. Poly(isobutene) (1.96 g, 16% conversion) was obtained with M$_w$=20.3 K and M$_w$/M$_n$=1.88.

Comparative Example 3

Using the procedure summarized in Example 10, 10.0 mL of a hexane:CH$_2$Cl$_2$ (60:40 v:v) solution of [Ph$_3$C][B(C$_6$F$_5$)$_4$] (2.4 mM) was added to 18.0 mL of IB and 18.0 mL of anti-freeze solution at −60° C. On addition the mixture turned yellow in color. After 1 hour work-up as described above provided no poly(isobutene).

Comparative Example 4

Using the procedure summarized in Example 10, a hexane solution of B(C$_6$F$_5$)$_3$ (10.0 mL of 2.4 mM) was added to 18.0 mL of IB and 18.0 mL of anti-freeze solution at −60° C. After 1 hour, work-up as described above failed to provide detectable quantities of polymer.

Comparative Example 5

Using the procedure summarized in Example 12, 18.0 mL of IB was condensed into a solution of 0.020 g (2.39×10$^{-5}$ moles) [Li][B(C$_6$F$_5$)$_4$] in 18.0 mL of anti-freeze solution. The flask contents were then stirred under N$_2$ at −60° C. at 550 rpm. Polymerization was allowed to continue for a full hour before warming the reactor contents to room temperature by diluting the reactor contents with additional water and CH$_2$Cl$_2$. During this period, large amounts of gas evolved. Organics were then extracted with CH$_2$Cl$_2$ and dried over MgSO$_4$ before isolating solids by removal of volatiles under reduced pressure. No PIB was isolated and the addition of 18.0 mL of CH$_2$Cl$_2$ to increase the solubility of this salt in the organic phase did not affect the outcome.

Comparative Example 6

Using the procedure summarized in Example 12, 1.0 mL of a toluene solution of [(Et$_2$O)$_2$H][B(C$_6$F$_5$)$_4$] (12 mM) was to 18.0 mL of IB and 18.0 mL of anti-freeze solution at −60° C. After 1 hour work-up as described above provided no poly(isobutene).

Comparative Example 7

Using the procedure summarized in Example 12, 1.0 mL of a toluene solution of 9,10-(C$_6$F$_5$B)$_2$C$_{12}$F$_8$ (compound 2, 10 mM) was added to 18.0 mL of IB and 18.0 mL of anti-freeze solution at −60° C. After 1 hour work-up as described above provided no poly(isobutene).

Example 25

Synthesis of 1,2-bis-(9-Bora-1,2,3,4,5,6,7,8-octafluorofluorenyl-3,4,5,6-tetrafluorobenzene: 1,2-[B(C$_{12}$F$_8$)]$_2$C$_6$F$_4$ General Considerations. NMR spectra were measured on a Bruker Avance DRX-400 ($^{11}$B at 128.41 MHz) and a Bruker AMX2-300 ($^{19}$F at 282.41 MHz). $^{11}$B NMR spectra were referenced relative to BF$_3$.Et$_2$O at 0 ppm. $^{19}$F NMR spectra were referenced externally to C$_6$F$_6$ at −163 ppm relative to CFCl$_3$ at 0 ppm. 1,2-Dibromotetrafluorobenzene (Aldrich), 1.6 M BuLi (Aldrich), KHF$_2$ (Aldrich), and BF$_3$ (Aldrich) were used as supplied. B(OCH$_3$)$_3$ (Aldrich) was distilled over Na prior to use and BBr$_3$ (Aldrich) was distilled from Cu wire prior to use.

All manipulations with aryldihalogenboranes were performed using standard vacuum and Schlenk techniques or in a glovebox under an atmosphere of argon. CH$_2$Cl$_2$ was distilled from CaH$_2$ prior to use. CD$_2$Cl$_2$ and C$_6$D$_6$ were purchased from Cambridge Isotopes and rigorously dried then distilled from CaH$_2$ and Na/benzophenone respectively. CD$_3$CN and D$_2$O were purchased from Cambridge Isotopes and Aldrich, respectively, and used as is.

The synthesis of 1,2-bis-(9-bora-1,2,3,4,5,6,7,8-octafluorofluorenyl)-3,4,5,6-tetrafluorobenzene described below is schematically illustrated in FIG. 2.

Synthesis of 1,2-bis-[(Dihydroxy)boryl]tetrafluorobenzene (1. Butyllithium (1.6 M in hexanes, 12.6 mL, 20.16 mmol) was added dropwise to a stirred solution of 1,2-dibromotetrafluorobenzene (2.6 g, 8.44 mmol) in ether (50 mL) at −78° C. After 2 hours this solution was slowly added to a pre-cooled solution (−78° C.) of trimethylborate (2.3 mL, 20.52 mmol) in ether (25 mL). The resulting suspension was stirred at −78° C. for two hours then gradually warmed to room temperature and hydrolyzed with 20 mL of 10% HCl. The yellow organic phase was separated and the aqueous phase was extracted with dichloromethane (3×15 mL). The combined organic phases were washed with water (3×10 mL) and dried over magnesium sulfate. Removal of solvent under reduced pressure gave a yellow oil that was recrystallized from water at a pH of 4 to afford a crystalline solid. (1.5 g, 75%) $^{19}$F NMR (D$_2$O/HCl) d: −136.6 (d, J$_{F-F}$=28.3 Hz, 2F, C$_6$F$_4$), −156.5 (d, J$_{F-F}$=28.3 Hz, 2F, C$_6$F$_4$). $^{11}$B NMR (D$_2$O/HCl) d: 16.9 (br).

Synthesis of Potassium Tetrafluorophenyl-bis-1,2-trifluoroborate (2). A solution of the bis-boronic acid 1 (2.4 g, 10.11 mmol) in methanol (20 mL) was added to a stirred solution of potassium hydrogenfluoride (5.5 g, 70.41 mmol) in water (40 mL) and stirred for 1 hour. The solution was filtered and the solid was washed with water (3×10 mL) then ether (3×10 mL) and dried under reduced pressure. The product was recrystallized from hot acetonitrile affording an off-white solid (1.04 g, 28%). $^{19}$F NMR (CD$_3$CN/D$_2$O) d: −139.0 (d, J$_{F-F}$=28.2 Hz, 2F, C$_6$F$_4$), −144.1 (m, 6F, —BF$_3$), −160.1 (d, J$_{F-F}$=28.2 Hz, 2F, C$_6$F$_4$). $^{11}$B NMR (CD$_3$CN/D$_2$O) d: 3.9 (multiplet).

Synthesis of 1,2-bis-(Difluoroboryl)tetrafluorobenzene (3). An excess of boron trifluoride gas was introduced to a stirred suspension of the potassium aryltrifluoroborate salt 2 (1.0 g, 27.32 mmol) in dichloromethane in a thick walled bomb at −40° C. After 30 minutes the solution was degassed under vacuum at −78° C. The resultant red colored solution was filtered and the remaining solid was washed with dichloromethane (2×5 mL). A deep red liquid was obtained after the solvent was distilled from product under reduced pressure. (0.4 g, 60%). $^{19}$F NMR (CD$_2$Cl$_2$) d: −72.4 (br. s, 4F, —BF$_2$), −126.9 (m, 2F, C$_6$F$_4$), −146.5 (m, 2F, C$_6$F$_4$). $^{11}$B NMR (CD$_2$Cl$_2$) d: 22.6 (br m).

Synthesis of 1,2-bis-(Dibromoboryl)tetrafluorobenzene (4). Boron tribromide (0.76 g, 3.05 mmol) was introduced to a solution of 3 (0.15 g, 0.61 mmol) in toluene (5 mL) in a thick walled bomb at −78° C. The bomb was sealed and heated at 60° C. for 30 minutes. Volatiles were removed under reduced pressure to afford the desired product. (0.25 g, 85%). $^{19}$F NMR (C$_6$D$_6$) d: −125.7 (m, 2F, C$_6$F$_4$), −147.3 (m, 2F, C$_6$F$_4$). $^{11}$B NMR (C$_6$D$_6$) d: 54 (br).

Synthesis of 1,2-bis-[9-Bora-1,2,3,4,5,6,7,8-octafluorofluorenyl)tetrafluorobenzene (Compound I). C$_{12}$F$_8$SnMe$_2$ (0.786 g, 1.77 mmol) and C$_6$F$_4$(BBr$_2$)$_2$ (0.435 g, 0.84 mmol) were dissolved in toluene (20 ml), sealed in glass bomb equipped with a Kontes valve and heated to 85° C. for 36 hours. The solvent was removed in vacuo and the Me$_2$SnBr$_2$ by-product was removed via sublimation (30° C., 0.01 mm Hg). The sublimation residues were placed in a frit assembly and hexanes (30 ml) was condensed into the flask. The solution was cooled to −78° C. and stirred for 1 hour. The solution was cold filtered and a light yellow solid was obtained and dried in vacuo. Yield: 0.520 g, 81.2%. $^{19}$F NMR (C$_6$D$_6$): d −121.1 (br, 4F), −123.6 (aa'bb' pattern, 2F), −128.9 (br, 4F), −138.6 (br, 4F), −148.6 (aa'bb' pattern, 2F), −151.9 (br, 4F). 1$_{max}$(hexanes)425 nm e=5.9×10$^2$ L mol$^{-1}$ cm$^{-1}$. Anal. Calcd. for C$_{30}$F$_{20}$B$_2$: C, 47.29. Found: C 47.78.

Example 26

Synthesis of 1,2-bis-[Di(perfluorophenyl)boryl]-3,4,5,6-tetrafluorobenzene: 1,2-[B(C$_6$F$_5$)$_2$]$_2$C$_6$F$_4$ The synthesis of 1,2-bis-[di(perfluorophenyl)boryl]-3,4,5,6-tetrafluorobenzene (1,2-[B(C$_6$F$_5$)$_2$]$_2$C$_6$F$_4$) (Compound II) described below is schematically illustrated in FIG. 2.

Compound II was prepared from 1,2-bis-(dibromoboryl)tetrafluorobenzene (4), prepared as described above in Example 1.

Toluene (25 ml) was condensed into an evacuated bomb containing Zn(C$_6$F$_5$)$_2$ (1.40 g, 3.50 mmol) at −78° C. To this colorless solution was added boran 1,2-bis-(dibromoboryl)tetrafluorobenzene (0.84 g, 1.73 mmol) as a neat liquid. The mixture was heated at 80° C. for 12 hours, after which the toluene was removed under reduced pressure. The white residue was extracted using toluene (40 ml), filtered and concentrated. The product was isolated after crystallization from hot toluene and washing with cold hexanes (0.8 g, 0.95 mmol, 55%). $^{19}$F NMR (C$_6$D$_6$) δ−127.6 (m, 2F, C$_6$F$_4$); −128.5 (d, 8F, o-C$_6$F$_5$); −141.6 (m, 2F, C$_6$F$_4$); −148.9 (m, 4F, p-C$_6$F$_5$); −161.5 (m, 8F, m-C$_6$F$_5$). Anal. Calcd. for C$_{30}$B$_2$F$_{24}$: C, 42.9. Found: C, 42.5.

Thus it should be evident that method of the present invention is highly effective in synthesizing polyolefins in the absence of a halogenated solvent. The invention is particularly suited for the synthesis of polyisobutene and butyl rubber, but is necessarily limited thereto. Additionally, the process exemplified is a suspension polymerization, which facilitates heat and mass transfer. However, solution polymerization in liquid or diluted monomer and a supported catalyst is also envisioned within the present invention. The method of the present invention can be used separately with other methods and the like, as well as for the manufacture of other polyolefin materials.

It is, therefore, to be understood that any variations evident fall within the scope of the claimed invention and thus, the selection of specific component elements can be determined without departing from the spirit of the invention herein disclosed and described.

The invention claimed is:

1. A method for cationically polymerizing olefin monomer comprising the step of using a composition having the chemical structure:

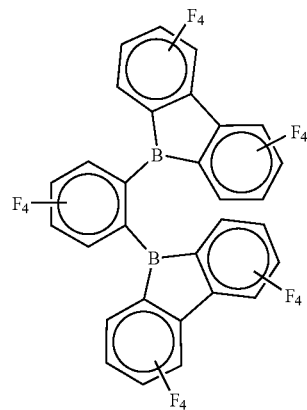

as a coinitiator in the presence of water.

2. The method of claim 1, wherein the chemical structure is:

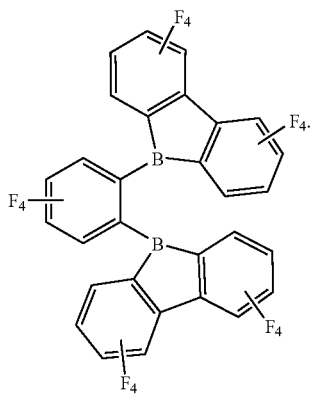

3. The method of claim 1, wherein the olefin monomer is selected from the group consisting of: ethylene, propylene, butene, pentene, hexene, heptene, octene, nonene, decene, dodecene, dodecyldocene, 3-methyl pentene, 3,5,5-trimethylhexene, isobutene, 2-methyl-butene, 2-methyl-pentene, vinyl ether, vinyl carbazole, isoprene, and combinations thereof.

4. The method of claim 1, wherein the olefin monomer is a C$_2$–C$_{30}$ olefin or a C$_2$–C$_{30}$ diolefin.

5. The method of claim 1, wherein the olefin monomer is isobutene.

6. The method of claim 1, wherein the coinitiator is used in an aqueous suspension or aqueous emulsion polymerization process.

7. A method for cationically polymerizing olefin monomer comprising the step of using a composition having the chemical structure:

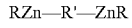

as a coinitiator in the presence of water;
wherein each R is independently selected from the group consisting of a perfluorophenyl; 3,5-bis(trifluoromethyl)phenyl; 1-perfluoronaphthyl; 2-perfluoronaphthyl; 2-perfluorobiphenyl; 3-perfluorobiphenyl; 4-perfluorobiphenyl; and p-R"$_3$Si-2,3,5,6-tetrafluorophenyl;
wherein R' is 1,2-perfluorophenylenyl; 1,2-perfluoronaphthalenyl; 2,3-perfluornapthalenyl; 1,8-perfluoronaphthalenyl; 1,2-perfluoroanthracenyl; 2,3-perfluoroanthracenyl; 1,9-perfluoroanthracenyl; 1,2-perfluorophenanthrenyl; 2,3-perfluorophenanthrenyl; 1,10-perfluorophenanthrenyl; 9,10-perfluorophenanthrenyl; 2,2'-perfluorobiphenylenyl; 2,2'-perfluoro-1,1'-binaphthalenyl; 3,3'-perfluoro-2,2'-binaphthalenyl; or 1,1'-ferrocenyl; and wherein R" is a $C_1$, $C_2$, $C_3$, $C_4$, $C_5$, $C_6$, $C_7$, $C_8$, $C_9$, or $C_{10}$ alkyl.

8. The method of claim 7, wherein the olefin monomer is selected from the group consisting of:
ethylene, propylene, butene, pentene, hexene, heptene, octene, nonene, decene, dodecene, dodecyldocene, 3-methyl pentene, 3,5,5-trimethylhexene, isobutene, 2-methyl-butene, 2-methyl-pentene, vinyl ether, vinyl carbazole, isoprene, and combinations thereof.

9. The method of claim 7, wherein the olefin monomer is a $C_2$–$C_{30}$ olefin or a $C_2$–$C_{30}$ diolefin.

10. The method of claim 7, wherein the olefin monomer is isobutene.

11. The method of claim 7, wherein the coinitiator is used in an aqueous suspension or aqueous emulsion polymerization process.

12. A method for cationically polymerizing olefin monomer comprising the step of using a composition having the chemical structure:

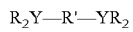

as a co-initiator in the presence of water;
wherein Y is boron;
wherein each R is independently selected from the group consisting of a perfluorophenyl; 3,5-bis(trifluoromethyl)phenyl; 1-perfluoronaphthyl; 2-perfluoronaphthyl; 2-perfluorobiphenyl; 3-perfluorobiphenyl; 4-perfluorobiphenyl; and p-R"$_3$Si-2,3,5,6-tetrafluorophenyl;
wherein R' is 1,2-perfluorophenylenyl; 1,2-perfluoronaphthalenyl; 2,3-perfluoronapthalenyl; 1,8-perfluoronaphthalenyl; 1,2-perfluoroanthracenyl; 2,3-perfluoroanthracenyl; 1,9-perfluoroanthracenyl; 1,2-perfluorophenanthrenyl; 2,3-perfluorophenanthrenyl; 1,10-perfluorophenanthrenyl; 9,10-perfluorophenanthrenyl; 2,2'-perfluorobiphenylenyl; 2,2'-perfluoro-1,1'-binaphthalenyl; 3,3'-perfluoro-2,2'-binaphthalenyl; or 1,1'-ferrocenyl; and wherein R" is a $C_1$, $C_2$, $C_3$, $C_4$, $C_5$, $C_6$, $C_7$, $C_8$, $C_9$, or $C_{10}$ alkyl.

13. The method of claim 12, wherein the chemical structure is:

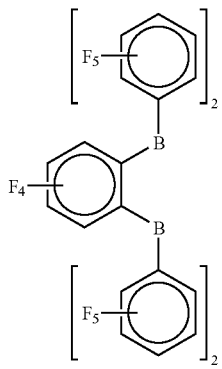

14. The method of claim 12, wherein the olefin monomer is selected from the group consisting of: ethylene, propylene, butene, pentene, hexene, heptene, octene, nonene, decene, dodecene, dodecyldocene, 3-methyl pentene, 3,5,5-trimethylhexene, isobutene, 2-methyl-butene, 2-methyl-pentene, vinyl ether, vinyl carbazole, isoprene, and combinations thereof.

15. The method of claim 12, wherein the olefin monomer is a $C_2$–$C_{30}$ olefin or a $C_2$–$C_{30}$ diolefin.

16. The method of claim 12, wherein the olefin monomer is isobutene.

17. The method of claim 12, wherein the coinitiator is used in an aqueous suspension or aqueous emulsion polymerization process.

18. A method for cationically polymerizing olefin monomers comprising the step of using a composition having the chemical structure:

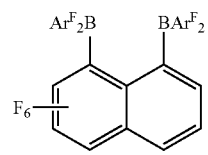

wherein $Ar^F = C_6F_5$ or $Ar^F{}_2 = C_{12}F_8$ as a coinitiator in the presence of water.

19. The method of claim 18, wherein the olefin monomer is selected from the group consisting of:
ethylene, propylene, butene, pentene, hexene, heptene, octene, nonene, decene, dodecene, dodecyldocene, 3-methyl pentene, 3,5,5-trimethylhexene, isobutene, 2-methyl-butene, 2-methyl-pentene, vinyl ether, vinyl carbazole, isoprene, and combinations thereof.

20. The method of claim 18, wherein the olefin monomer is a $C_2$–$C_{30}$ olefin or a $C_2$–$C_{30}$ diolefin.

21. The method of claim 18, wherein the olefin monomer is isobutene.

22. The method of claim 18, wherein the coinitiator is used in an aqueous suspension or aqueous emulsion polymerization process.

23. A method for cationically polymerizing olefin monomers comprising the step of using a composition having the chemical structure:

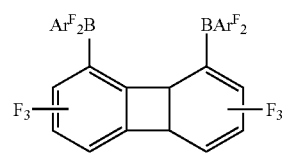

wherein $Ar^F = C_6F_5$ or $Ar^F{}_2 = C_{12}F_8$ as a coinitiator in the presence of water.

24. The method of claim 23, wherein the olefin monomer is selected from the group consisting of:
ethylene, propylene, butene, pentene, hexene, heptene, octene, nonene, decene, dodecene, dodecyldocene, 3-methyl pentene, 3,5,5-trimethylhexene, isobutene, 2-methyl-butene, 2-methyl-pentene, vinyl ether, vinyl carbazole, isoprene, and combinations thereof.

25. The method of claim 23, wherein the olefin monomer is a $C_2$–$C_{30}$ olefin or a $C_2$–$C_{30}$ diolefin.

26. The method of claim 23, wherein the olefin monomer is isobutene.

27. The method of claim 23, wherein the coinitiator is used in an aqueous suspension or aqueous emulsion polymerization process.

28. A method for cationically polymerizing olefin monomers comprising the step of using a composition having the chemical structure:

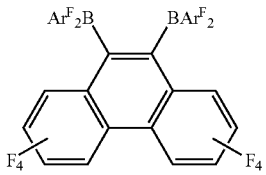

wherein $Ar^F=C_6F_5$ or $Ar^F_2=C_{12}F_8$ as a coinitiator in the presence of water.

29. The method of claim 28, wherein the olefin monomer is selected from the group consisting of:

ethylene, propylene, butene, pentene, hexene, heptene, octene, nonene, decene, dodecene, dodecyldocene, 3-methyl pentene, 3,5,5-trimethylhexene, isobutene, 2-methyl-butene, 2-methyl-pentene, vinyl ether, vinyl carbazole, isoprene, and combinations thereof.

30. The method of claim 28, wherein the olefin monomer is a $C_2$–$C_{30}$ olefin or a $C_2$–$C_{30}$ diolefin.

31. The method of claim 28, wherein the olefin monomer is isobutene.

32. The method of claim 28, wherein the coinitiator is used in an aqueous suspension or aqueous emulsion polymerization process.

33. A method for cationically polymerizing olefin monomers comprising the step of using a composition having the chemical structure:

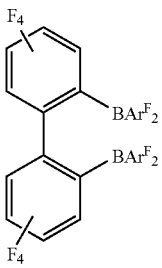

wherein $Ar^F=C_6F_5$ or $Ar^F_2=C_{12}F_8$ as a coinitiator in the presence of water.

34. The method of claim 33, wherein the olefin monomer is selected from the group consisting of:

ethylene, propylene, butene, pentene, hexene, heptene, octene, nonene, decene, dodecene, dodecyldocene, 3-methyl pentene, 3,5,5-trimethylhexene, isobutene, 2-methyl-butene, 2-methyl-pentene, vinyl ether, vinyl carbazole, isoprene, and combinations thereof.

35. The method of claim 33, wherein the olefin monomer is a $C_2$–$C_{30}$ olefin or a $C_2$–$C_{30}$ diolefin.

36. The method of claim 33, wherein the olefin monomer is isobutene.

37. The method of claim 33, wherein the coinitiator is used in an aqueous suspension or aqueous emulsion polymerization process.

38. A method for cationically polymerizing olefin monomers comprising the step of using a composition having the chemical structure:

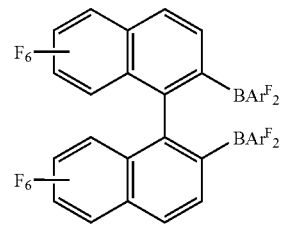

wherein $Ar^F=C_6F_5$ or $Ar^F_2=C_{12}F_8$ as a coinitiator in the presence of water.

39. The method of claim 38, wherein the olefin monomer is selected from the group consisting of:

ethylene, propylene, butene, pentene, hexene, heptene, octene, nonene, decene, dodecene, dodecyldocene, 3-methyl pentene, 3,5,5-trimethylhexene, isobutene, 2-methyl-butene, 2-methyl-pentene, vinyl ether, vinyl carbazole, isoprene, and combinations thereof.

40. The method of claim 38, wherein the olefin monomer is a $C_2$–$C_{30}$ olefin or a $C_2$–$C_{30}$ diolefin.

41. The method of claim 38, wherein the olefin monomer is isobutene.

42. The method of claim 38, wherein the coinitiator is used in an aqueous suspension or aqueous emulsion polymerization process.

43. A method for cationically polymerizing olefin monomers comprising the step of using a composition having the chemical structure:

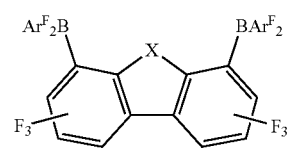

wherein $X=CH_2$, NR, or O and $Ar^F=C_6F_5$ or $Ar^F_2=C_{12}F_8$ as a coinitiator in the presence of water.

44. The method of claim 43, wherein the olefin monomer is selected from the group consisting of:

ethylene, propylene, butene, pentene, hexene, heptene, octene, nonene, decene, dodecene, dodecyldocene, 3-methyl pentene, 3,5,5-trimethylhexene, isobutene, 2-methyl-butene, 2-methyl-pentene, vinyl ether, vinyl carbazole, isoprene, and combinations thereof.

45. The method of claim 43, wherein the olefin monomer is a $C_2$–$C_{30}$ olefin or a $C_2$–$C_{30}$ diolefin.

46. The method of claim 43, wherein the olefin monomer is isobutene.

47. The method of claim 43, wherein the coinitiator is used in an aqueous suspension or aqueous emulsion polymerization process.

48. A method for cationically polymerizing olefin monomers comprising the step of using a composition having the chemical structure:

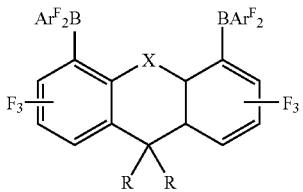

wherein X=CH$_2$, NR, or O and Ar$^F$=C$_6$F$_5$ or Ar F$_2$=C$_{12}$F$_8$ as a coinitiator in the presence of water.

49. The method of claim 48, wherein the olefin monomer is selected from the group consisting of:
ethylene, propylene, butene, pentene, hexene, heptene, octene, nonene, decene, dodecene, dodecyldocene, 3-methyl pentene, 3,5,5-trimethylhexene, isobutene, 2-methyl-butene, 2-methyl-pentene, vinyl ether, vinyl carbazole, isoprene, and combinations thereof.

50. The method of claim 48, wherein the olefin monomer is a C$_2$–C$_{30}$ olefin or a C$_2$–C$_{30}$ diolefin.

51. The method of claim 48, wherein the olefin monomer is isobutene.

52. The method of claim 48, wherein the coinitiator is used in an aqueous suspension or aqueous emulsion polymerization process.

53. A method for cationically polymerizing olefin monomers comprising the step of using a composition having the chemical structure:

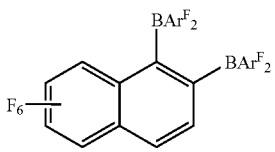

wherein Ar$^F$=C$_6$F$_5$ or Ar F$_2$=C$_{12}$F$_8$ as a coinitiator in the presence of water.

54. The method of claim 53, wherein the olefin monomer is selected from the group consisting of:
ethylene, propylene, butene, pentene, hexene, heptene, octene, nonene, decene, dodecene, dodecyldocene, 3-methyl pentene, 3,5,5-trimethylhexene, isobutene, 2-methyl-butene, 2-methyl-pentene, vinyl ether, vinyl carbazole, isoprene, and combinations thereof.

55. The method of claim 53, wherein the olefin monomer is a C$_2$–C$_{30}$ olefin or a C$_2$–C$_{30}$ diolefin.

56. The method of claim 53, wherein the olefin monomer is isobutene.

57. The method of claim 53, wherein the coinitiator is used in an aqueous suspension or aqueous emulsion polymerization process.

58. A method for cationically polymerizing olefin monomers comprising the step of using a composition having the chemical structure:

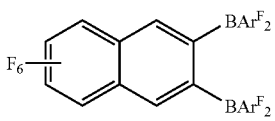

wherein Ar$^F$=C$_6$F$_5$ or Ar F$_2$=C$_{12}$F$_8$ as a coinitiator in the presence of water.

59. The method of claim 58, wherein the olefin monomer is selected from the group consisting of:
ethylene, propylene, butene, pentene, hexene, heptene, octene, nonene, decene, dodecene, dodecyldocene, 3-methyl pentene, 3,5,5-trimethylhexene, isobutene, 2-methyl-butene, 2-methyl-pentene, vinyl ether, vinyl carbazole, isoprene, and combinations thereof.

60. The method of claim 58, wherein the olefin monomer is a C$_2$–C$_{30}$ olefin or a C$_2$–C$_{30}$ diolefin.

61. The method of claim 58, wherein the olefin monomer is isobutene.

62. The method of claim 58, wherein the coinitiator is used in an aqueous suspension or aqueous emulsion polymerization process.

63. A method for cationically polymerizing olefin monomers comprising the step of using a composition having the chemical structure:

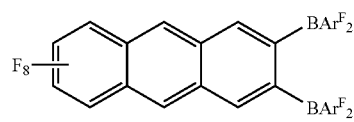

wherein Ar$^F$=C$_6$F$_5$ or Ar$^F_2$=C$_{12}$F$_8$ as a coinitiator in the presence of water.

64. The method of claim 63, wherein the olefin monomer is selected from the group consisting of:
ethylene, propylene, butene, pentene, hexene, heptene, octene, nonene, decene, dodecene, dodecyldocene, 3-methyl pentene, 3,5,5-trimethylhexene, isobutene, 2-methyl-butene, 2-methyl-pentene, vinyl ether, vinyl carbazole, isoprene, and combinations thereof.

65. The method of claim 63, wherein the olefin monomer is a C$_2$–C$_{30}$ olefin or a C$_2$–C$_{30}$ diolefin.

66. The method of claim 63, wherein the olefin monomer is isobutene.

67. The method of claim 63, wherein the coinitiator is used in an aqueous suspension or aqueous emulsion polymerization process.

68. A method for cationically polymerizing olefin monomers comprising the step of using a composition having the chemical structure:

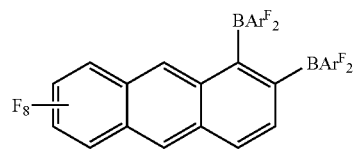

wherein Ar$^F$=C$_6$F$_5$ or Ar$^F_2$=C$_{12}$F$_8$ as a coinitiator in the presence of water.

69. The method of claim 68, wherein the olefin monomer is selected from the group consisting of:
ethylene, propylene, butene, pentene, hexene, heptene, octene, nonene, decene, dodecene, dodecyldocene, 3-methyl pentene, 3,5,5-trimethylhexene, isobutene, 2-methyl-butene, 2-methyl-pentene, vinyl ether, vinyl carbazole, isoprene, and combinations thereof.

70. The method of claim 68, wherein the olefin monomer is a $C_2$–$C_{30}$ olefin or a $C_2$–$C_{30}$ diolefin.

71. The method of claim 68, wherein the olefin monomer is isobutene.

72. The method of claim 68, wherein the coinitiator is used in an aqueous suspension or aqueous emulsion polymerization process.

73. A method for cationically polymerizing olefin monomers comprising the step of using a composition having the chemical structure:

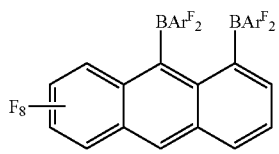

wherein $Ar^F=C_6F_5$ or $Ar^F{}_2=C_{12}F_8$ as a coinitiator in the presence of water.

74. The method of claim 73, wherein the olefin monomer is selected from the group consisting of:
ethylene, propylene, butene, pentene, hexene, heptene, octene, nonene, decene, dodecene, dodecyldocene, 3-methyl pentene, 3,5,5-trimethylhexene, isobutene, 2-methyl-butene, 2-methyl-pentene, vinyl ether, vinyl carbazole, isoprene, and combinations thereof.

75. The method of claim 73, wherein the olefin monomer is a $C_2$–$C_{30}$ olefin or a $C_2$–$C_{30}$ diolefin.

76. The method of claim 73, wherein the olefin monomer is isobutene.

77. The method of claim 73, wherein the coinitiator is used in an aqueous suspension or aqueous emulsion polymerization process.

78. A method for cationically polymerizing olefin monomers comprising the step of using a composition having the chemical structure:

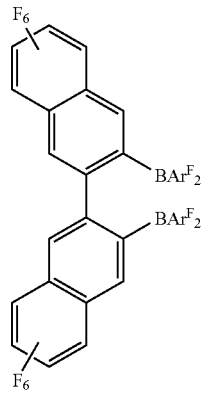

wherein $Ar^F=C_6F_5$ or $Ar\ F_2=C_{12}F_8$ as a coinitiator in the presence of water.

79. The method of claim 78, wherein the olefin monomer is selected from the group consisting of:
ethylene, propylene, butene, pentene, hexene, heptene, octene, nonene, decene, dodecene, dodecyldocene, 3-methyl pentene, 3,5,5-trimethylhexene, isobutene, 2-methyl-butene, 2-methyl-pentene, vinyl ether, vinyl carbazole, isoprene, and combinations thereof.

80. The method of claim 78, wherein the olefin monomer is a $C_2$–$C_{30}$ olefin or a $C_2$–$C_{30}$ diolefin.

81. The method of claim 78, wherein the olefin monomer is isobutene.

82. The method of claim 78, wherein the coinitiator is used in an aqueous suspension or aqueous emulsion polymerization process.

83. A method comprising the step:

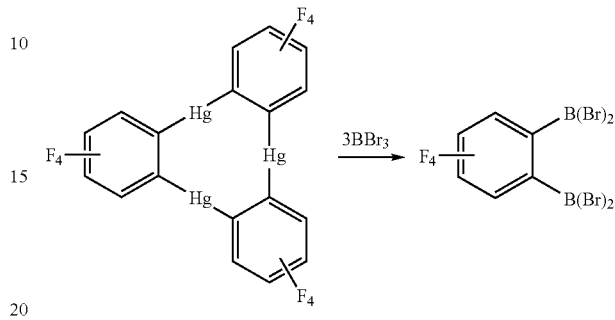

wherein the step is performed at a temperature less than about 35° C.

84. The method of claim 83, wherein the step is performed at a temperature less than about 25° C.

85. A method for cationically polymerizing olefin monomer comprising the step of using a composition having the chemical structure:

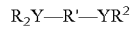

as a co-initiator in the presence of water;
wherein Y is aluminum; wherein each R is independently selected from the group consisting of a perfluorophenyl; 3,5-bis(trifluoromethyl)phenyl; 1-perfluoronaphthyl; 2-perfluoronaphthyl; 2-perfluorobiphenyl; 3-perfluorobiphenyl; 4-perfluorobiphenyl; and p-R"$_3$Si-2,3,5,6-tetrafluorophenyl;
wherein R' is 1,2-perfluorophenylenyl; 1,2-perfluoronaphthalenyl; 2,3-perfluoronapthalenyl; 1,8-perfluoronaphthalenyl; 1,2-perfluoroanthracenyl; 2,3-perfluoroanthracenyl; 1,9-perfluoroanthracenyl; 1,2-perfluorophenanthrenyl; 2,3-perfluorophenanthrenyl; 1,10-perfluorophenanthrenyl; 9,10-perfluorophenanthrenyl; 2,2'-perfluorobiphenylenyl; 2,2'-perfluoro-1,1'-binaphthalenyl; 3,3'-perfluoro-2,2'-binaphthalenyl; or 1,1'-ferrocenyl; and
wherein R" is a $C_1$, $C_2$, $C_3$, $C_4$, $C_5$, $C_6$, $C_7$, $C_8$, $C_9$, or $C_{10}$ alkyl.

86. The method of claim 85, wherein the chemical structure is:

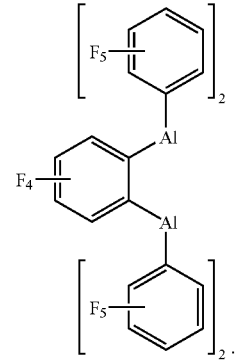

87. The method of claim 85, wherein the olefin monomer is selected from the group consisting of: ethylene, propylene, butene, pentene, hexene, heptene, octene, nonene, decene, dodecene, dodecyldocene, 3-methyl pentene, 3,5,5-trimethylhexene, isobutene, 2-methyl-butene, 2-methyl-pentene, vinyl ether, vinyl carbazole, isoprene, and combinations thereof.

88. The method of claim 85, wherein the olefin monomer is a $C_2$–$C_{30}$ olefin or a $C_2$–$C_{30}$ diolefin.

89. The method of claim 85, wherein the olefin monomer is isobutene.

90. The method of claim 85, wherein the coinitiator is used in an aqueous suspension or aqueous emulsion polymerization process.

* * * * *